United States Patent
Wang et al.

(10) Patent No.: US 10,133,633 B2
(45) Date of Patent: Nov. 20, 2018

(54) DATA STORAGE METHOD, DATA RECOVERY METHOD, RELATED APPARATUS, AND SYSTEM

(71) Applicant: HUAWEI TECHNOLOGIES CO., LTD., Shenzhen, Guangdong (CN)

(72) Inventors: Daohui Wang, Shenzhen (CN); Feng Zhang, Shenzhen (CN); Wei Fan, Shenzhen (CN); Zhile Zhang, Shenzhen (CN); Yongqiang Zeng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/817,298

(22) Filed: Nov. 20, 2017

(65) Prior Publication Data

US 2018/0074898 A1    Mar. 15, 2018

Related U.S. Application Data

(60) Continuation of application No. 15/603,413, filed on May 23, 2017, now Pat. No. 9,823,970, which is a
(Continued)

(30) Foreign Application Priority Data

Jun. 4, 2015   (CN) .......................... 2015 1 0304374

(51) Int. Cl.
*G06F 11/00* (2006.01)
*G06F 11/10* (2006.01)
(Continued)

(52) U.S. Cl.
CPC .......... *G06F 11/1076* (2013.01); *G06F 3/064* (2013.01); *G06F 3/067* (2013.01);
(Continued)

(58) Field of Classification Search
CPC .. G06F 11/1076; G06F 3/0617; G06F 3/0619; G06F 3/0631; G06F 3/067; G06F 11/00
See application file for complete search history.

(56) References Cited

U.S. PATENT DOCUMENTS

| 4,761,785 A | 8/1988 | Clark et al. |
| 6,223,323 B1 * | 4/2001 | Wescott ............. G06F 11/1076 |
| | | 714/770 |

(Continued)

FOREIGN PATENT DOCUMENTS

| CN | 101488104 A | 7/2009 |
| CN | 103051691 A | 4/2013 |

(Continued)

OTHER PUBLICATIONS

Henry C.H. Chen et al. "NCCIoud: A Network-Coding-Based Storage System in a Cloud-of-Clouds", IEEE Transactions on Computers, vol. 63, No. 1, Jan. 2014, 14 pages.
(Continued)

*Primary Examiner* — Esaw T Abraham
(74) *Attorney, Agent, or Firm* — Huawei Technologies Co,. Ltd.

(57) ABSTRACT

A data storage method is used to improve storage consistency of a distributed storage system. The method includes: a primary storage node performs EC coding on a to-be-stored data segment to obtain a target EC stripe; determines in a storage node group to which the primary storage node belongs, m+k target storage nodes used to store m+k target EC blocks of the target EC stripe; sends a preparation message to the target storage nodes; receives a response message sent by a target storage node; and sends an execution message to the target storage nodes to instruct the target storage nodes to write target EC blocks that are in preparation logs.

16 Claims, 11 Drawing Sheets

Related U.S. Application Data division of application No. 15/173,327, filed on Jun. 3, 2016, now Pat. No. 9,710,331.

(51) Int. Cl.

| | | |
|---|---|---|
| *G06F 3/06* | (2006.01) | |
| *G06F 9/46* | (2006.01) | |
| *G06F 9/50* | (2006.01) | |

(52) U.S. Cl.
CPC .......... *G06F 3/0617* (2013.01); *G06F 3/0619* (2013.01); *G06F 3/0631* (2013.01); *G06F 9/466* (2013.01); *G06F 9/5011* (2013.01); *G06F 11/00* (2013.01)

(56) References Cited

U.S. PATENT DOCUMENTS

| | | | |
|---|---|---|---|
| 6,275,898 B1 | 8/2001 | Dekoning | |
| 6,643,748 B1 | 11/2003 | Wieland | |
| 6,725,392 B1 | 4/2004 | Frey et al. | |
| 6,938,123 B2* | 8/2005 | Willis | G06F 3/0607 |
| | | | 711/114 |
| 6,985,995 B2 | 1/2006 | Holland et al. | |
| 7,266,716 B2* | 9/2007 | Frolund | G06F 11/1076 |
| | | | 714/5.1 |
| 7,356,731 B2* | 4/2008 | Corbett | G06F 11/1076 |
| | | | 714/6.21 |
| 7,725,655 B2 | 5/2010 | Frolund et al. | |
| 7,743,276 B2 | 6/2010 | Jacobson et al. | |
| 7,761,663 B2* | 7/2010 | Frolund | G06F 11/1064 |
| | | | 709/201 |
| 7,870,464 B2* | 1/2011 | Hafner | G06F 11/1076 |
| | | | 714/718 |
| 8,037,391 B1 | 10/2011 | Jung et al. | |
| 8,051,205 B2 | 11/2011 | Roy et al. | |
| 8,055,845 B2* | 11/2011 | Soules | G06F 12/0862 |
| | | | 709/223 |
| 8,103,904 B2* | 1/2012 | Hafner | G06F 9/466 |
| | | | 714/6.24 |
| 8,132,073 B1 | 3/2012 | Bowers et al. | |
| 8,156,368 B2* | 4/2012 | Chambliss | G06F 11/1092 |
| | | | 711/162 |
| 8,245,113 B2* | 8/2012 | Winarski | G06F 11/1088 |
| | | | 714/770 |
| 8,726,129 B1 | 5/2014 | Aguilera et al. | |
| 8,839,076 B2 | 9/2014 | Mittelholzer et al. | |
| 8,874,863 B2 | 10/2014 | Mutalik et al. | |
| 9,069,786 B2 | 6/2015 | Colgrove et al. | |
| 9,229,810 B2 | 1/2016 | He et al. | |
| 9,495,246 B2* | 11/2016 | Gordon | G06F 11/1076 |
| 9,495,255 B2 | 11/2016 | Davis et al. | |
| 9,870,284 B2* | 1/2018 | Blaum | G06F 11/1076 |
| 2005/0091556 A1 | 4/2005 | Frolund et al. | |
| 2010/0115335 A1 | 5/2010 | Wylie et al. | |
| 2011/0208995 A1 | 8/2011 | Hafner et al. | |
| 2011/0302446 A1 | 12/2011 | Becker-Szendy et al. | |
| 2014/0304472 A1 | 10/2014 | Colgrove et al. | |
| 2014/0372689 A1 | 12/2014 | Colgrove et al. | |
| 2015/0149819 A1 | 5/2015 | Lee et al. | |

FOREIGN PATENT DOCUMENTS

| | | |
|---|---|---|
| CN | 103699494 A | 4/2014 |
| CN | 103827806 A | 5/2014 |
| CN | 103984607 A | 8/2014 |
| EP | 2787446 A1 | 10/2014 |
| JP | S62293355 A | 12/1987 |
| JP | 2014529126 A | 10/2014 |
| WO | 2015057240 A1 | 4/2015 |

OTHER PUBLICATIONS

Yuchong Hu et al. "NCFS: On the Practicality and Extensibility of a Network-Coding-Based Distributed File System", IEEE 2011, 6 pages.

* cited by examiner

DATA STORAGE METHOD, DATA RECOVERY METHOD, RELATED APPARATUS, AND SYSTEM

CROSS-REFERENCE TO RELATED APPLICATIONS

This application is a continuation of U.S. patent application Ser. No. 15/603,413, filed on May 23, 2017, now U.S. Pat. No. 9,823,970, which is a divisional application of U.S. patent application Ser. No. 15/173,327, filed on Jun. 3, 2016, now U.S. Pat. No. 9,710,331. The U.S. patent application Ser. No. 15/173,327 claims priority to Chinese Patent Application No. 201510304374.7, filed on Jun. 4, 2015. All of the afore-mentioned patent applications are hereby incorporated by reference in their entireties.

TECHNICAL FIELD

The present invention relates to the field of data storage, and in particular, to a data storage method, a data recovery method, a related apparatus, and a system.

BACKGROUND

Currently, distributed storage systems increasingly use an erasure coding (EC) technology to store data. A principle of the erasure coding technology is to divide data into m data blocks, and perform parity coding on the m data blocks by using a redundancy algorithm, to generate k parity blocks, where the m data blocks and the k parity blocks are called one EC stripe. A data block or a parity block is also called an EC block, and each EC stripe is tolerable to a loss of k EC blocks.

To ensure storage reliability, a distributed storage system distributes m+k EC blocks of each EC stripe to m+k storage nodes for storage. In this way, even if a node is faulty, an EC block stored on the faulty node can be recovered according to data stored on another node. It may be understood that the distributed storage system using the EC technology is tolerable to concurrent faults of k storage nodes.

However, writing an EC block into a storage node requires a period of time. If a storage node in m+k storage nodes used to store an EC stripe is faulty when writing an EC block, a case in which a part of the storage nodes have an EC block of the EC stripe but the other part of the storage nodes do not have an EC block of the EC stripe occurs, causing storage inconsistency of the EC stripe. Therefore, storage consistency of the distributed storage system is poor.

SUMMARY

Embodiments of the present invention provide a data recovery method, used to improve storage consistency of a distributed storage system.

A first aspect of the embodiments of the present invention provides a data storage method, applied to a distributed storage system, where the distributed storage system stores data by using erasure coding (EC) stripes, each EC stripe includes a data part and a parity part, the data part of each EC stripe includes m data blocks, the parity part of each EC stripe includes k parity blocks that are obtained after parity coding is performed on the m data blocks, and the m data blocks and the k parity blocks constitute EC blocks of each EC stripe; the distributed storage system includes multiple storage node groups, each storage node group includes not less than m+k storage nodes, one primary storage node is specified in each storage node group, and nodes in each storage node group other than the primary storage node are secondary storage nodes, where m and k are both positive integers; and the method is executed by a primary storage node in any one of the storage node groups and includes: receiving a to-be-stored data segment, and performing EC coding on the to-be-stored data segment to obtain a target EC stripe, where a size of the to-be-stored data segment is not greater than Z, Z is a size of m data blocks, the target EC stripe includes m+k target EC blocks, and the m+k target EC blocks include m target data blocks and k target parity blocks;

determining m+k target storage nodes, where the m+k target storage nodes are configured to store the m+k target EC blocks, and each target storage node stores one of the target EC blocks;

sending a preparation message to the m+k target storage nodes separately, where each preparation message includes a target EC block to be stored by each target storage node;

receiving a response message sent by any target storage node of the m+k target storage nodes, where the response message is used to indicate that the target storage node currently sending the response message has generated a preparation log according to the preparation message, and the preparation log includes a target EC block to be stored by the target storage node currently sending the response message; and after receiving response messages of all the target storage nodes in the m+k target storage nodes, sending an execution message to the m+k target storage nodes, where the execution message is used to instruct the m+k target storage nodes to write the target EC blocks included in the preparation logs.

With reference to the first aspect of the embodiments of the present invention, in a first implementation manner of the first aspect of the embodiments of the present invention, the preparation message further includes a version number of the target EC stripe;

the preparation log further includes the version number of the target EC stripe; and the execution message is specifically used to instruct the m+k target storage nodes to write the target EC blocks and the version number of the target EC stripe that are in the preparation logs.

With reference to the first implementation manner of the first aspect of the embodiments of the present invention, a second implementation manner of the first aspect of the embodiments of the present invention further includes:

if it is detected that a faulty storage node exists in the m+k target storage nodes, after fault recovery of the faulty storage node, determining whether version numbers of the target EC stripe on the m+k target storage nodes are the same, where the version numbers of the target EC stripe on the m+k target storage nodes include version numbers of the target EC stripe in preparation logs on target storage nodes that have generated preparation logs and/or version numbers of the target EC stripe stored by target storage nodes that have no preparation log; and if the version numbers of the target EC stripe on all the target storage nodes in the m+k target storage nodes are the same, sending an execution message to the target storage nodes that have generated preparation logs, where the execution message is used to instruct the target storage nodes to write the target EC blocks included in the preparation logs.

With reference to the second implementation manner of the first aspect of the embodiments of the present invention, a third implementation manner of the first aspect of the embodiments of the present invention further includes:

if the version numbers of the target EC stripe on the target storage nodes in the m+k target storage nodes are different, sending a deletion message to the target storage nodes that have generated preparation logs, where the deletion message is used to instruct the target storage nodes to delete the preparation logs.

A second aspect of the embodiments of the present invention provides a data recovery method, applied to a distributed storage system, where the distributed storage system stores data by using erasure coding (EC) stripes, each EC stripe includes a data part and a parity part, the data part of each EC stripe includes m data blocks, the parity part of each EC stripe includes k parity blocks that are obtained after parity coding is performed on the m data blocks, and the m data blocks and the k parity blocks constitute EC blocks of each EC stripe; each EC stripe corresponds to a key value, key values of EC stripes having same address ranges of data parts are the same, and key values of EC stripes having different address ranges of data parts are different; the distributed storage system includes multiple storage node groups, each storage node group includes not less than m+k storage nodes, one primary storage node is specified in each storage node group, and nodes in each storage node group other than the primary storage node are secondary storage nodes, where m and k are both positive integers; and when a faulty storage node exists in secondary storage nodes in any one of the storage node groups, the method is executed by a primary storage node in the any one of the storage node groups and includes:

after fault recovery of the faulty storage node, receiving a recovery message sent by the faulty storage node;

obtaining N lost EC blocks of the faulty storage node through computation according to EC blocks stored by non-faulty storage nodes in the storage node group, where the N is a positive integer;

sequentially sending the N lost EC blocks to the faulty storage node to execute storage;

in the process of sequentially sending the N lost EC blocks to the faulty storage node, if the primary storage node generates a first EC block and determines that the first EC block is to be stored by the faulty storage node, determining whether a second EC block having a same key value as the first EC block exists in the lost EC blocks that are currently not stored successfully by the faulty storage node; and if it is determined that the second EC block exists, after the faulty storage node successfully stores the second EC block, sending the first EC block to the faulty storage node to execute storage.

With reference to the second aspect of the embodiments of the present invention, in a first implementation manner of the second aspect of the embodiments of the present invention, the sequentially sending the N lost EC blocks to the faulty storage node for storage includes:

sending an $n^{th}$ lost EC block to the faulty storage node, where $1 \le n \le N$;

receiving a response message corresponding to the $n^{th}$ lost EC block, where the response message is sent by the faulty storage node, and the response message is used to indicate that the faulty storage node has successfully stored the $n^{th}$ lost EC block; and after receiving the response message of the faulty storage node with respect to the $n^{th}$ lost EC block, if n<N, adding 1 to a value of n, and re-executing the step of sending an $n^{th}$ lost EC block to the faulty storage node.

With reference to the first implementation manner of the second aspect of the embodiments of the present invention, in a second implementation manner of the second aspect of the embodiments of the present invention, the lost EC blocks that are currently not stored successfully include the lost EC blocks that are not sent to the faulty storage node currently and the lost EC blocks that are sent to the faulty storage node currently but response messages corresponding to which are not received.

With reference to the second aspect of the embodiments of the present invention or the first or second implementation manner of the second aspect, in a third implementation manner of the second aspect of the embodiments of the present invention, a logical volume of the distributed storage system includes multiple logical partitions, each logical partition is of a size of k data blocks and does not overlap each other, each logical partition uniquely corresponds to one key value, and a key value of a logical partition that each EC block falls within is a key value of the EC block.

A third aspect of the embodiments of the present invention provides a data storage apparatus, where the distributed storage system stores data by using erasure coding (EC) stripes, each EC stripe includes a data part and a parity part, the data part of each EC stripe includes m data blocks, the parity part of each EC stripe includes k parity blocks that are obtained after parity coding is performed on the m data blocks, and the m data blocks and the k parity blocks constitute EC blocks of each EC stripe; the distributed storage system includes multiple storage node groups, each storage node group includes not less than m+k storage nodes, one primary storage node is specified in each storage node group, and nodes in each storage node group other than the primary storage node are secondary storage nodes, where m and k are both positive integers; and the data storage apparatus is deployed on a primary storage node in any one of the storage node groups, and the data storage apparatus includes:

a data coding module, configured to receive a to-be-stored data segment, and perform EC coding on the to-be-stored data segment to obtain a target EC stripe, where a size of the to-be-stored data segment is not greater than Z, Z is a size of m data blocks, the target EC stripe includes m+k target EC blocks, and the m+k target EC blocks include m target data blocks and k target parity blocks;

a node determining module, configured to determine m+k target storage nodes, where the m+k target storage nodes are configured to store the m+k target EC blocks, and each target storage node stores one of the target EC blocks;

a message sending module, configured to send a preparation message to the m+k target storage nodes separately, where each preparation message includes a target EC block to be stored by each target storage node; and a message receiving module, configured to receive a response message sent by any target storage node of the m+k target storage nodes, where the response message is used to indicate that the target storage node currently sending the response message has generated a preparation log according to the preparation message, and the preparation log includes a target EC block to be stored by the target storage node currently sending the response message, where the message sending module is further configured to send an execution message to the m+k target storage nodes after the message receiving module receives response messages of all the target storage nodes in the m+k target storage nodes, where the execution message is used to instruct the m+k target storage nodes to write the target EC blocks included in the preparation logs.

With reference to the third aspect of the embodiments of the present invention, in a first implementation manner of the third aspect of the embodiments of the present invention, the preparation message further includes a version number of the target EC stripe;

the preparation log further includes the version number of the target EC stripe; and the execution message is specifically used to instruct the m+k target storage nodes to write the target EC blocks and the version number of the target EC stripe that are in the preparation logs.

With reference to the first implementation manner of the third aspect of the embodiments of the present invention, in a second implementation manner of the third aspect of the embodiments of the present invention, the apparatus further includes:

a version determining module, configured to: when it is detected that a faulty storage node exists in the m+k target storage nodes, after fault recovery of the faulty storage node, determine whether version numbers of the target EC stripe on the m+k target storage nodes are the same, where the version numbers of the target EC stripe on the m+k target storage nodes include version numbers of the target EC stripe in preparation logs on target storage nodes that have generated preparation logs and/or version numbers of the target EC stripe stored by target storage nodes that have no preparation log, where the message sending module is specifically configured to: if the version numbers of the target EC stripe on all the target storage nodes in the m+k target storage nodes are the same, send an execution message to the target storage nodes that have generated preparation logs, where the execution message is used to instruct the target storage nodes to write the target EC blocks included in the preparation logs.

With reference to the second implementation manner of the third aspect of the embodiments of the present invention, in a third implementation manner of the third aspect of the embodiments of the present invention, the message sending module is further configured to:

if the version numbers of the target EC stripe on the target storage nodes in the m+k target storage nodes are different, send a deletion message to the target storage nodes that have generated preparation logs, where the deletion message is used to instruct the target storage nodes to delete the preparation logs.

A fourth aspect of the embodiments of the present invention provides a data recovery apparatus, applied to a distributed storage system, where the distributed storage system stores data by using erasure coding (EC) stripes, each EC stripe includes a data part and a parity part, the data part of each EC stripe includes m data blocks, the parity part of each EC stripe includes k parity blocks that are obtained after parity coding is performed on the m data blocks, and the m data blocks and the k parity blocks constitute EC blocks of each EC stripe; each EC stripe corresponds to a key value, key values of EC stripes having same address ranges of data parts are the same, and key values of EC stripes having different address ranges of data parts are different; the distributed storage system includes multiple storage node groups, each storage node group includes not less than m+k storage nodes, one primary storage node is specified in each storage node group, and nodes in each storage node group other than the primary storage node are secondary storage nodes, where m and k are both positive integers; and a faulty storage node exists in secondary storage nodes in any storage node group in the distributed storage system, the data recovery apparatus is deployed on a primary storage node in the storage node group to which the faulty storage node belongs, and the data recovery apparatus includes:

a recovery message module, configured to: after fault recovery of the faulty storage node, receive a recovery message sent by the faulty storage node;

a data computation module, configured to obtain N lost EC blocks of the faulty storage node through computation according to EC blocks stored by non-faulty storage nodes in the storage node group, where the N is a positive integer;

a data sending module, configured to sequentially send the N lost EC blocks to the faulty storage node to execute storage; and a key value determining module, configured to: in the process of sequentially sending the N lost EC blocks to the faulty storage node, if the primary storage node generates a first EC block and determines that the first EC block is to be stored by the faulty storage node, determine whether a second EC block having a same key value as the first EC block exists in the lost EC blocks that are currently not stored successfully by the faulty storage node, where the data sending module is further configured to: if the key value determining module determines that the second EC block exists, after the faulty storage node successfully stores the second EC block, send the first EC block to the faulty storage node to execute storage.

With reference to the fourth aspect of the embodiments of the present invention, in a first implementation manner of the fourth aspect of the embodiments of the present invention, the data sending module is specifically configured to:

send an $n^{th}$ lost EC block to the faulty storage node, where $1 \leq n \leq N$;

receive a response message corresponding to the $n^{th}$ lost EC block, where the response message is sent by the faulty storage node, and the response message is used to indicate that the faulty storage node has successfully stored the $n^{th}$ lost EC block; and after receiving the response message of the faulty storage node with respect to the $n^{th}$ lost EC block, if n<N, add 1 to a value of n, and re-execute the step of sending an $n^{th}$ lost EC block to the faulty storage node.

With reference to the first implementation manner of the fourth aspect of the embodiments of the present invention, in a second implementation manner of the fourth aspect of the embodiments of the present invention, the lost EC blocks that are currently not stored successfully include the lost EC blocks that are not sent to the faulty storage node currently and the lost EC blocks that are sent to the faulty storage node currently but response messages corresponding to which are not received.

With reference to the fourth aspect of the embodiments of the present invention or the first or second implementation manner of the fourth aspect, in a third implementation manner of the fourth aspect of the embodiments of the present invention, a logical volume of the distributed storage system includes multiple logical partitions, each logical partition is of a size of k data blocks and does not overlap each other, each logical partition uniquely corresponds to one key value, and a key value of a logical partition that each EC block falls within is a key value of the EC block.

A fifth aspect of the embodiments of the present invention provides a data storage apparatus, where the data storage apparatus includes an input apparatus, an output apparatus, a processor, and a memory, where by invoking an operation instruction stored in the memory, the processor is configured to:

receive a to-be-stored data segment, and perform EC coding on the to-be-stored data segment to obtain a target EC stripe, where a size of the to-be-stored data segment is not greater than Z, Z is a size of m data blocks, the target EC stripe includes m+k target EC blocks, and the m+k target EC blocks include m target data blocks and k target parity blocks;

determine m+k target storage nodes, where the m+k target storage nodes are configured to store the m+k target EC blocks, and each target storage node stores one of the target EC blocks;

send a preparation message to the m+k target storage nodes separately, where each preparation message includes a target EC block to be stored by each target storage node;

receive a response message sent by any target storage node of the m+k target storage nodes, where the response message is used to indicate that the target storage node currently sending the response message has generated a preparation log according to the preparation message, and the preparation log includes a target EC block to be stored by the target storage node currently sending the response message; and after receiving response messages of all the target storage nodes in the m+k target storage nodes, send an execution message to the m+k target storage nodes, where the execution message is used to instruct the m+k target storage nodes to write the target EC blocks included in the preparation logs.

With reference to the fifth aspect of the embodiments of the present invention, in a first implementation manner of the fifth aspect of the embodiments of the present invention, the preparation message further includes a version number of the target EC stripe;

the preparation log further includes the version number of the target EC stripe; and the execution message is specifically used to instruct the m+k target storage nodes to write the target EC blocks and the version number of the target EC stripe that are in the preparation logs.

With reference to the first implementation manner of the fifth aspect of the embodiments of the present invention, in a second implementation manner of the fifth aspect of the embodiments of the present invention, the processor is further configured to:

if it is detected that a faulty storage node exists in the m+k target storage nodes, after fault recovery of the faulty storage node, determine whether version numbers of the target EC stripe on the m+k target storage nodes are the same, where the version numbers of the target EC stripe on the m+k target storage nodes include version numbers of the target EC stripe in preparation logs on target storage nodes that have generated preparation logs and/or version numbers of the target EC stripe stored by target storage nodes that have no preparation log; and if the version numbers of the target EC stripe on all the target storage nodes in the m+k target storage nodes are the same, send an execution message to the target storage nodes that have generated preparation logs, where the execution message is used to instruct the target storage nodes to write the target EC blocks included in the preparation logs.

With reference to the second implementation manner of the fifth aspect of the embodiments of the present invention, in a third implementation manner of the fifth aspect of the embodiments of the present invention, the processor is further configured to:

if the version numbers of the target EC stripe on the target storage nodes in the m+k target storage nodes are different, send a deletion message to the target storage nodes that have generated preparation logs, where the deletion message is used to instruct the target storage nodes to delete the preparation logs.

A sixth aspect of the embodiments of the present invention provides a data recovery apparatus, where the data recovery apparatus includes an input apparatus, an output apparatus, a processor, and a memory, where by invoking an operation instruction stored in the memory, the processor is configured to:

after fault recovery of a faulty storage node, receive a recovery message sent by the faulty storage node;

obtain N lost EC blocks of the faulty storage node through computation according to EC blocks stored by non-faulty storage nodes in a storage node group to which the faulty storage node belongs, where the N is a positive integer;

sequentially send the N lost EC blocks to the faulty storage node to execute storage;

in the process of sequentially sending the N lost EC blocks to the faulty storage node, if the primary storage node generates a first EC block and determines that the first EC block is to be stored by the faulty storage node, determine whether a second EC block having a same key value as the first EC block exists in the lost EC blocks that are currently not stored successfully by the faulty storage node; and if it is determined that the second EC block exists, after the faulty storage node successfully stores the second EC block, send the first EC block to the faulty storage node to execute storage.

With reference to the sixth aspect of the embodiments of the present invention, in a first implementation manner of the sixth aspect of the embodiments of the present invention, the processor is further configured to:

send an $n^{th}$ lost EC block to the faulty storage node, where $1 \leq n \leq N$;

receive a response message corresponding to the $n^{th}$ lost EC block, where the response message is sent by the faulty storage node, and the response message is used to indicate that the faulty storage node has successfully stored the $n^{th}$ lost EC block; and after receiving the response message of the faulty storage node with respect to the $n^{th}$ lost EC block, if n<N, add 1 to a value of n, and re-execute the step of sending an $n^{th}$ lost EC block to the faulty storage node.

With reference to the first implementation manner of the sixth aspect of the embodiments of the present invention, in a second implementation manner of the sixth aspect of the embodiments of the present invention, the lost EC blocks that are currently not stored successfully include the lost EC blocks that are not sent to the faulty storage node currently and the lost EC blocks that are sent to the faulty storage node currently but response messages corresponding to which are not received.

With reference to the sixth aspect of the embodiments of the present invention or the first or second implementation manner of the sixth aspect, in a third implementation manner of the sixth aspect of the embodiments of the present invention, a logical volume of the distributed storage system includes multiple logical partitions, each logical partition is of a size of k data blocks and does not overlap each other, each logical partition uniquely corresponds to one key value, and a key value of a logical partition that each EC block falls within is a key value of the EC block.

A seventh aspect of the embodiments of the present invention provides a computer readable medium, including a computer-executable instruction, where when a processor of a computer executes the computer-executable instruction, the computer executes the following method:

receiving a to-be-stored data segment, and performing EC coding on the to-be-stored data segment to obtain a target EC stripe, where a size of the to-be-stored data segment is not greater than Z, Z is a size of m data blocks, the target EC stripe includes m+k target EC blocks, and the m+k target EC blocks include m target data blocks and k target parity blocks;

determining m+k target storage nodes, where the m+k target storage nodes are configured to store the m+k target EC blocks, and each target storage node stores one of the target EC blocks;

sending a preparation message to the m+k target storage nodes separately, where each preparation message includes a target EC block to be stored by each target storage node;

receiving a response message sent by any target storage node of the m+k target storage nodes, where the response message is used to indicate that the target storage node currently sending the response message has generated a preparation log according to the preparation message, and the preparation log includes a target EC block to be stored by the target storage node currently sending the response message; and after receiving response messages of all the target storage nodes in the m+k target storage nodes, sending an execution message to the m+k target storage nodes, where the execution message is used to instruct the m+k target storage nodes to write the target EC blocks included in the preparation logs.

With reference to the seventh aspect of the embodiments of the present invention, in a first implementation manner of the seventh aspect of the embodiments of the present invention, the preparation message further includes a version number of the target EC stripe;

the preparation log further includes the version number of the target EC stripe; and the execution message is specifically used to instruct the m+k target storage nodes to write the target EC blocks and the version number of the target EC stripe that are in the preparation logs.

With reference to the first implementation manner of the seventh aspect of the embodiments of the present invention, in a second implementation manner of the seventh aspect of the embodiments of the present invention, the computer further executes the following method:

if it is detected that a faulty storage node exists in the m+k target storage nodes, after fault recovery of the faulty storage node, determining whether version numbers of the target EC stripe on the m+k target storage nodes are the same, where the version numbers of the target EC stripe on the m+k target storage nodes include version numbers of the target EC stripe in preparation logs on target storage nodes that have generated preparation logs and/or version numbers of the target EC stripe stored by target storage nodes that have no preparation log; and if the version numbers of the target EC stripe on all the target storage nodes in the m+k target storage nodes are the same, sending an execution message to the target storage nodes that have generated preparation logs, where the execution message is used to instruct the target storage nodes to write the target EC blocks included in the preparation logs.

With reference to the second implementation manner of the seventh aspect of the embodiments of the present invention, in a third implementation manner of the seventh aspect of the embodiments of the present invention, the computer further executes the following method:

if the version numbers of the target EC stripe on the target storage nodes in the m+k target storage nodes are different, sending a deletion message to the target storage nodes that have generated preparation logs, where the deletion message is used to instruct the target storage nodes to delete the preparation logs.

An eighth aspect of the embodiments of the present invention provides a computer readable medium, including a computer-executable instruction, where when a processor of a computer executes the computer-executable instruction, the computer executes the following method:

after fault recovery of a faulty storage node, receiving a recovery message sent by the faulty storage node;

obtaining N lost EC blocks of the faulty storage node through computation according to EC blocks stored by non-faulty storage nodes in a storage node group, where the N is a positive integer;

sequentially sending the N lost EC blocks to the faulty storage node to execute storage;

in the process of sequentially sending the N lost EC blocks to the faulty storage node, if a primary storage node generates a first EC block and determines that the first EC block is to be stored by the faulty storage node, determining whether a second EC block having a same key value as the first EC block exists in the lost EC blocks that are currently not stored successfully by the faulty storage node; and if it is determined that the second EC block exists, after the faulty storage node successfully stores the second EC block, sending the first EC block to the faulty storage node to execute storage.

With reference to the eighth aspect of the embodiments of the present invention, in a first implementation manner of the eighth aspect of the embodiments of the present invention, the computer further executes the following method:

sending an $n^{th}$ lost EC block to the faulty storage node, where $1 \leq n \leq N$;

receiving a response message corresponding to the $n^{th}$ lost EC block, where the response message is sent by the faulty storage node, and the response message is used to indicate that the faulty storage node has successfully stored the $n^{th}$ lost EC block; and after receiving the response message of the faulty storage node with respect to the $n^{th}$ lost EC block, if n<N, adding 1 to a value of n, and re-executing the step of sending an $n^{th}$ lost EC block to the faulty storage node.

With reference to the first implementation manner of the eighth aspect of the embodiments of the present invention, in a second implementation manner of the eighth aspect of the embodiments of the present invention, the lost EC blocks that are currently not stored successfully include the lost EC blocks that are not sent to the faulty storage node currently and the lost EC blocks that are sent to the faulty storage node currently but response messages corresponding to which are not received.

With reference to the eighth aspect of the embodiments of the present invention or the first or second implementation manner of the eighth aspect, in a third implementation manner of the eighth aspect of the embodiments of the present invention, a logical volume of the distributed storage system includes multiple logical partitions, each logical partition is of a size of k data blocks and does not overlap each other, each logical partition uniquely corresponds to one key value, and a key value of a logical partition that each EC block falls within is a key value of the EC block.

A ninth aspect of the embodiments of the present invention provides a storage node, including the data storage apparatus according to the third aspect of the embodiments of the present invention or any one of the first to third implementation manners of the third aspect and/or the data recovery apparatus according to the fourth aspect of the embodiments of the present invention or any one of the first to third implementation manners of the fourth aspect, and/or, including the data storage apparatus according to the fifth aspect of the embodiments of the present invention or any one of the first to third implementation manners of the fifth aspect and/or the data recovery apparatus according to the sixth aspect of the embodiments of the present invention or any one of the first to third implementation manners of the sixth aspect, and/or, including the computer readable medium according to the seventh aspect of the embodiments of the present invention or any one of the first to third implementation manners of the seventh aspect and/or the computer readable medium according to the eighth aspect of the embodiments of the present invention or any one of the first to third implementation manners of the eighth aspect.

A data storage method provided by an embodiment of the present invention includes: performing, by a primary node, EC coding on a to-be-stored data segment to obtain a target EC stripe, where the target EC stripe includes m+k target EC blocks; determining, in secondary storage nodes in a storage node group, m+k target storage nodes used to store the m+k target EC blocks; sending a preparation message to the target storage nodes, where the preparation message carries a target EC block to be stored by the target storage nodes; receiving a response message sent by a target storage node; and after receiving response messages of all the target storage nodes, sending an execution message to all the target storage nodes, to instruct the target storage nodes to write target EC blocks that are in the preparation logs. In the method provided by this embodiment, the m+k target storage nodes used to store the target EC stripe do not directly write the to-be-stored target EC blocks, but first write the to-be-stored target EC blocks into locally generated preparation logs, and after all the target storage nodes generate preparation logs, write the target EC blocks. A target storage node executes an operation of writing a target EC block into a correct location only in a case in which all the target storage nodes have generated preparation logs. Even if a fault occurs in the process of writing the target EC block by the target storage node, the target EC block has been stored in a preparation log of the target storage node. In this way, it can be ensured that the target EC block is not lost regardless of whether the operation of writing the target EC block is successful. Therefore, a case in which a part of the target storage nodes have target EC blocks of the target EC stripe but the other part of the target storage nodes do not have target EC blocks of the target EC stripe is avoided, the target EC stripe can be stored consistently, and storage consistency of a distributed storage system is improved.

DESCRIPTION OF EMBODIMENTS

The embodiments of the present invention provide a data storage method, used to improve storage consistency of a distributed storage system. The embodiments of the present invention further provide a data recovery method, a related apparatus, and a system, which are described separately below.

The distributed storage system includes multiple storage nodes. An upper-layer data delivery apparatus divides to-be-stored data into multiple data blocks, and then delivers the data blocks to the multiple storage nodes of the distributed storage system for storage. Distributed storage of data can reduce a data loss risk and improve reliability of the distributed storage system. The data delivery apparatus may be a client, a server, or another device.

Figure 1A:
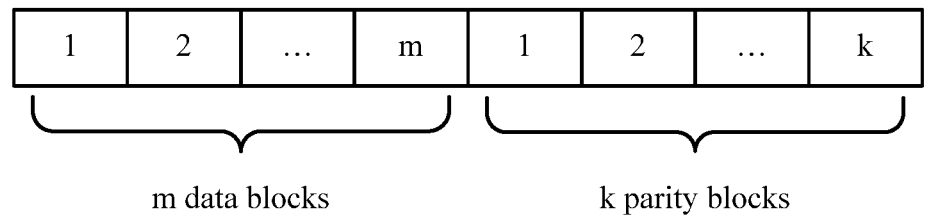
FIG. 1A is a structural diagram of an EC stripe.

A principle of an EC technology is to divide to-be-stored data into m data blocks, and perform parity coding on the m data blocks by using a redundancy algorithm, to generate k parity blocks, where the m data blocks and the k parity blocks constitute one EC stripe. For a basic structure of the EC stripe, refer to FIG. 1A. Each data block or parity block may also be referred to as an EC block, and the m data blocks and the k parity blocks constitute all EC blocks of each EC stripe. Each EC stripe is tolerable to a loss of k EC blocks. When the distributed storage system uses the EC technology to perform data storage, the data delivery apparatus generates multiple EC stripes according to the to-be-stored data, and delivers m+k EC blocks of each EC stripe to m+k storage nodes of the distributed storage system for storage. In this way, when a node in the distributed storage system is faulty, an EC block stored on the faulty node can be recovered according to EC blocks on non-faulty nodes. Unless more than k storage nodes in the m+k storage nodes storing an EC stripe are faulty, data of the EC stripe can be read or written by the data delivery apparatus completely. Therefore, the distributed storage system that uses the EC technology to store data has very high reliability.

An EC stripe stored in the distributed storage system can be read or overwritten by the data delivery apparatus. It should be noted that, when reading an EC stripe, the data delivery apparatus only needs to read, from the EC stripe, a data block used to store data. However, when an EC stripe is overwritten, for example, when an $i^{th}$ data block in m data blocks of an EC stripe is overwritten, other data blocks of the EC stripe do not need to be changed, but it is necessary to regenerate parity blocks of the EC stripe.

Figure 1B:
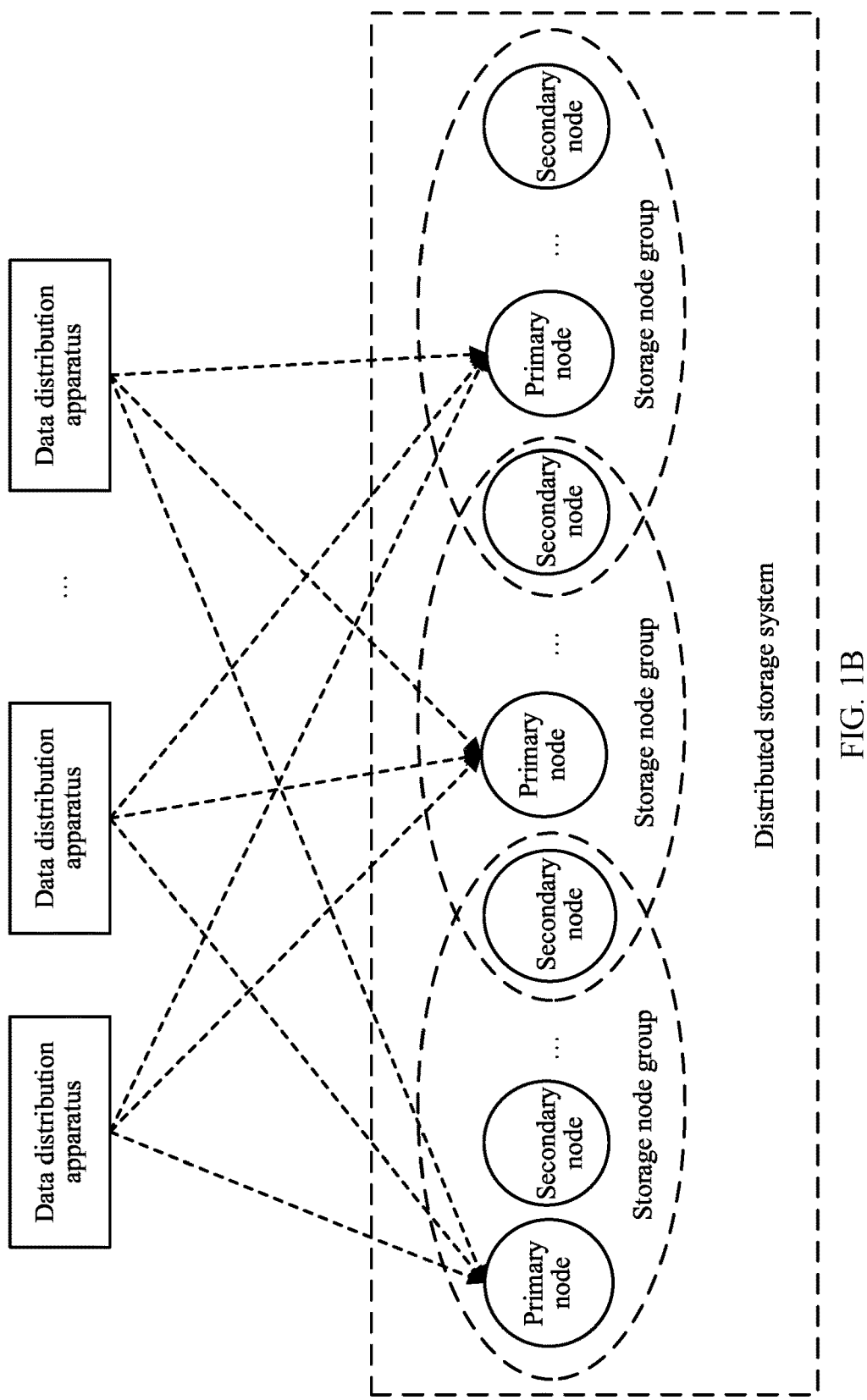
FIG. 1B is a schematic structural diagram of a distributed storage system according to an embodiment of the present invention.

Particularly, storage nodes in the distributed storage system are grouped in the embodiments of the present invention. Specifically, storage nodes are grouped into multiple storage node groups, where a quantity of storage nodes included in each storage node group is not less than m+k, and one primary storage node (primary node for short below) is specified in each storage node group. Other storage nodes are secondary storage nodes (secondary nodes for short below). m and k are both positive integers. Storage nodes of different storage node groups may be repeatable. For example, a primary node in a storage node group 1 may be a secondary node in a storage node group 2. FIG. 1B is a schematic structural diagram of a distributed storage system according to an embodiment of the present invention. FIG. 1B is used to indicate only a structure of the distributed storage system, and storage nodes in the distributed storage system may also be in other connection structures.

Figure 2:
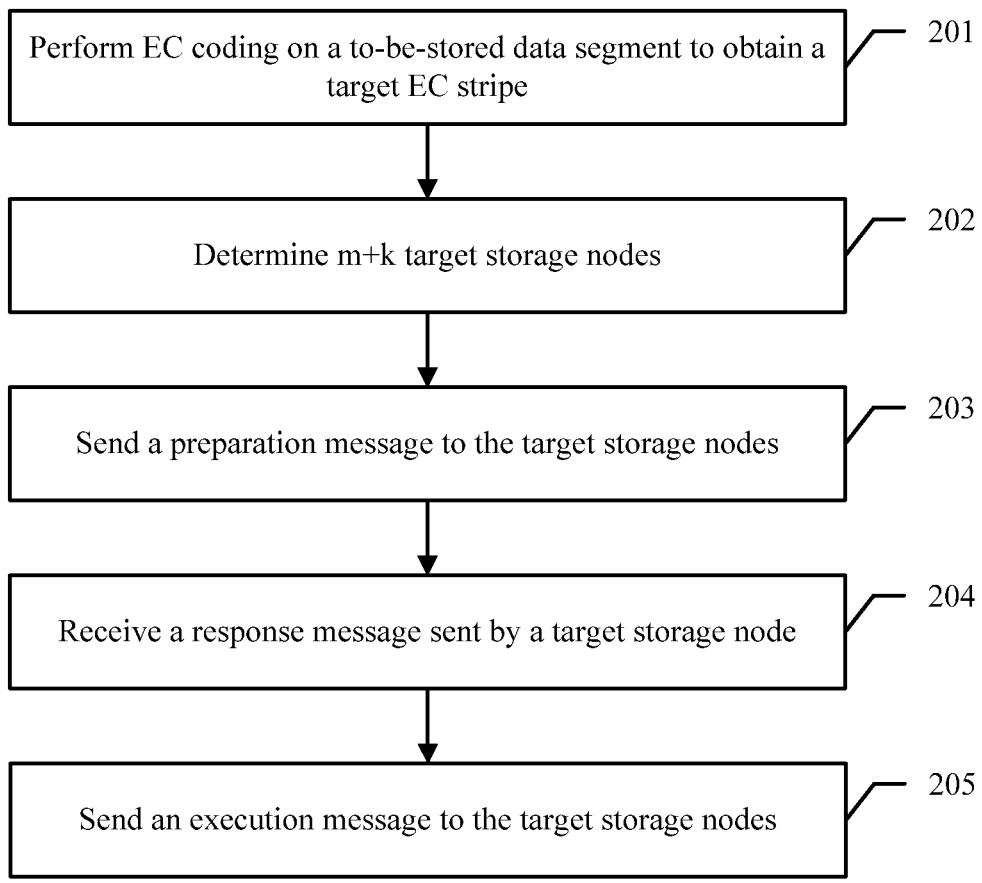
FIG. 2 is a flowchart of an embodiment of a data storage method according to an embodiment of the present invention.

Based on the foregoing distributed storage system, an embodiment of the present invention provides a data storage method, applied to a primary node in any storage node group of the distributed storage system. Referring to FIG. 2, a basic procedure of the method includes:

201. Perform EC Coding on a to-be-Stored Data Segment to Obtain a Target EC Stripe.

A primary node receives a to-be-stored data segment delivered by a data delivery apparatus, where a size of the to-be-stored data segment is not greater than Z, and Z is a size of m data blocks. The target EC stripe after coding includes m+k target EC blocks, which specifically include m target data blocks and k target parity blocks.

202. Determine m+k Target Storage Nodes.

After generating the m+k target EC blocks, the primary node determines, in a storage node group to which the primary node belongs, m+k target storage nodes used to store the m+k target EC blocks. The m+k target storage nodes may include the primary node and m+k−1 secondary nodes, or may include m+k secondary nodes. Each target storage node stores a maximum of one EC block only.

Particularly, if the storage node group includes only m+k storage nodes (the primary node and m+k−1 secondary nodes), the primary node directly determines that the m+k storage nodes are target storage nodes.

203. Send a Preparation Message to the Target Storage Nodes.

After determining the target storage nodes, the primary node sends a preparation message to the m+k target storage nodes separately, where each preparation message carries a target EC block to be stored by each target storage node.

For target storage nodes that are secondary nodes, the preparation message sent by the primary node to the target storage node is an inter-node message sent through a network. However, it is mentioned in step 202 that the primary node may also be one of the target storage nodes. If the primary node is a target storage node, the primary node also sends a preparation message to the primary node itself in this step, but the preparation message sent to the primary node itself is an intra-node message that does not pass through the network.

204. Receive a Response Message Sent by a Target Storage Node.

After receiving the preparation message sent by the primary node, the target storage node generates a preparation log according to the preparation message, where the preparation log is stored on the target storage node locally. A purpose of the preparation log is mainly to temporarily store an EC block to be stored by the target storage node. Therefore, a storage location of the preparation log is not a final storage location of the target EC block. In an actual application, the preparation log may be a log or a data block, or in any other form, which is not limited in this embodiment, but the preparation log needs to include the target EC block in the preparation message received by the target storage node.

After generating the preparation log, the target storage node sends a response message to the primary node, used to notify the primary node that the target secondary storage node currently sending the response message has generated the preparation log according to the preparation message.

The response message sent by the target storage node as a secondary node is an inter-node message sent through the network. However, if the primary node is also one of the target storage nodes, the primary node also sends a response message to the primary node itself in this step, but the response message sent to the primary node itself is an intra-node message that does not pass through the network.

The primary node receives a response message sent by any one or more target storage nodes in the m+k target storage nodes, and after receiving response messages sent by all target storage nodes in the m+k target storage nodes, executes step 205.

205. Send an Execution Message to the Target Storage Nodes.

After receiving the response messages sent by all the target storage nodes, the primary node sends a execution message to the m+k target storage nodes, to instruct the m+k target storage nodes to write the target EC blocks included in the preparation logs. After receiving the execution message, the m+k target storage nodes read the preparation logs from storage locations of the preparation logs, and write the target EC blocks included in the preparation logs into locations that are used to store the target EC blocks and on the target storage nodes.

For target storage nodes that are secondary nodes, the execution message sent by the primary node to the target storage node is an inter-node message sent through the network. However, it is mentioned in step 202 that the primary node may also be one of the target storage nodes. If the primary node is a target storage node, the primary node also sends an execution message to the primary node itself in this step, but the execution message sent to the primary node itself is an intra-node message that does not pass through the network.

This embodiment provides a data storage method, including: performing EC coding on a to-be-stored data segment to obtain a target EC stripe, where the target EC stripe includes m+k target EC blocks; determining, in secondary storage nodes in a storage node group, m+k target storage nodes used to store the m+k target EC blocks; sending a preparation message to the target storage nodes, where the preparation message carries a target EC block to be stored by the target storage nodes; receiving a response message sent by a target storage node; and after receiving response messages of all the target storage nodes, sending an execution message to all the target storage nodes, to instruct the target storage nodes to write target EC blocks that are in the preparation logs. In the method provided by this embodiment, the m+k target storage nodes used to store the target EC stripe do not directly write the to-be-stored target EC blocks, but first write the to-be-stored target EC blocks into locally generated preparation logs, and after all the target storage nodes generate preparation logs, write the target EC blocks. A target storage node executes an operation of writing a target EC block into a correct location only in a case in which all the target storage nodes have generated preparation logs. Even if a fault occurs in the process of writing the target EC block by the target storage node, the target EC block has been stored in a preparation log of the target storage node. In this way, it can be ensured that the target EC block is not lost regardless of whether the operation of writing the target EC block is successful. Therefore, a case in which a part of the target storage nodes have target EC blocks of the target EC stripe but the other part of the target storage nodes do not have target EC blocks of the target EC stripe is avoided, the target EC stripe can be stored consistently, and storage consistency of a distributed storage system is improved.

Preferably, in still another embodiment of the present invention, to ensure that a preparation log generated by a target storage node is not lost when the target storage node is faulty, the target storage node may write the preparation log into a power failure protection medium.

A concept of a key value of an EC stripe is introduced in this embodiment of the present invention. Specifically, a key value of an EC stripe corresponds to an address range of a data part of the EC stripe, and key values of EC stripes having same address ranges of data parts are the same, but key values of EC stripes having different address ranges of data parts are different. The key value may be carried in each EC block of the EC stripe.

The key value of the EC stripe may come from a data segment delivered by the data delivery apparatus to the primary node. For example, a logical volume of the distributed storage system may be divided into multiple logical partitions, and each logical partition is of a size of k data blocks. The data delivery apparatus divides to-be-stored data into multiple data segments, and specifically, uses data that falls within one logical partition as one data segment. A unique key value is set for each logical partition of the distributed storage system, and a key value corresponding to a logical partition that each data segment falls within is a key value corresponding to the data segment. The data delivery apparatus adds the key value to the data segment and delivers the data segment to the primary node, where an EC stripe generated by the primary node according to the data segment has a same key value as the data segment.

It can be seen from the foregoing description that the key value may be used to identify an address range of data. In addition, it is mentioned in step 205 that, after a target storage node receives the execution message, the target storage node reads the preparation log from the storage location of the preparation log, and writes the target EC block included in the preparation log into the location that is used to store the target EC block and on the target storage node. Specifically, if the target storage node does not store an EC block that has a key value same as the key value carried in the target EC block in the preparation log, the target storage node allocates a new storage location to the target EC block. If the target storage node stores an EC block that has a key value same as the key value carried in the target EC block in the preparation log, which indicates that old data has been written into an address range of the target EC block, the target storage node writes the target EC block into a location originally used to store an EC block that has a key value same as the key value of the target EC block, to overwrite the old data with new data. It may be understood that because the new data overwrites the old data, key values of multiple EC blocks stored on each storage node are different from each other.

A concept of a version number of an EC stripe is further introduced in this embodiment of the present invention. Specifically, the version number is used to identify a new or old degree of two EC stripes having a same key value. A written new EC stripe overwrites an old EC stripe. For example, at a moment, a primary node generates an EC stripe, where an address range of a data part is 4M-8M, a key value is 2, and a version number of the EC stripe is 1, the primary node allocates the EC stripe having the version number 1 to six storage nodes for storage. One hour later, the primary node generates again another EC stripe, where an address range of a data part is 4M-8M, a key value is 2, and a version number of the EC stripe is 2. The primary node writes the EC stripe having the version number 2 into a location originally used to store the EC stripe having the version number 1, so that the EC stripe having the version number 2 overwrites the EC stripe having the version number 1. The version number of the target EC stripe may be carried in each target EC block of the target EC stripe.

In this embodiment of the present invention, the preparation message sent by the primary node to a target storage node further includes a version number of the target EC stripe, and further, the preparation log generated by the target storage node according to the preparation message also includes the version number of the target EC stripe. The execution message specifically instructs the m+k target storage nodes to write the target EC blocks and the version number of the target EC stripe that are in the preparation logs. After the concept of the version number is introduced, whether storage of the EC stripe is consistent may be determined according to the version number. If version numbers of the target EC stripe written into the target storage nodes for storing the target EC stripe are the same, it indicates that storage of the target EC stripe is consistent; if version numbers of the target EC stripe written into the target storage nodes for storing the target EC stripe are different, it indicates that storage of the target EC stripe is inconsistent.

Because storage nodes in a storage node group of the distributed storage system may be faulty at any time, the storage node group needs to be maintained. The storage node group may be maintained in multiple manners, for example, an additional node group management module may be disposed. The node group management module may be deployed on a data delivery apparatus, or may be deployed on a storage node, which is not limited in this embodiment of the present invention. The node group management module is responsible for maintaining each storage node group. Specifically, the node group management module may be responsible for collecting information about storage nodes included in each storage node group, determining a primary node, and monitoring a status of each storage node in real time by using a heartbeat connection. When a status of a storage node changes or a primary node in a node group changes, the node group management module needs to update collected information. The node group management module notifies the collected information to each storage node for recording, so that each data delivery apparatus and storage node can learn the information about each node group. The information collected by the node group management module may be represented simply in a form of Table 1:

TABLE 1

| Node group ID | Node | Node identity | Node status |
|---|---|---|---|
| Node group 1 | A | Primary node | Normal |
| | B | Secondary node | Normal |
| | ... | ... | ... |
| | C | Secondary node | Faulty |

Table 1 is only a representation form of the information collected by the node group management module. The node group management module may represent the collected information in other forms, which is not limited in this embodiment of the present invention.

After determining the target storage nodes in step 202, if the primary node detects, by using the node group management module, that a faulty storage node exists in the m+k target storage nodes, the primary node needs to interrupt a data storage procedure and recover the faulty storage node. After the faulty storage node is recovered, the primary node needs to continue the data storage procedure. For details, refer to steps 1 to 3:

Step 1: Determine whether version numbers of the target EC stripe on the m+k target storage nodes are the same. If a target storage node has generated a preparation log, the version number of the target EC stripe on the target storage node may be a version number of the target EC stripe in the preparation log; if a target storage node has no preparation log, the version number of the target EC stripe on the target storage node may be a version number of the target EC stripe that has been stored by the target storage node.

If the version numbers of the target EC stripe on all the target storage nodes in the m+k target storage nodes are the same, it indicates that target storage nodes having no preparation log have completed the operation of writing to-be-stored target EC blocks, and step 2 is executed.

If the version numbers of the target EC stripe on the m+k target storage nodes are different, it indicates that target storage nodes having no preparation log do not generate preparation logs and further do not write to-be-stored target EC blocks, and step 3 is executed.

Step 2: Send an execution message to the target storage nodes that have generated preparation logs, where the execution message is used to instruct the target storage nodes to write the target EC blocks included in the preparation logs. After receiving the execution message, the target storage nodes that have generated preparation logs write the target EC blocks included in the preparation logs, so that the target EC stripe is stored on the target storage nodes consistently.

Step 3: Send a deletion message to the target storage nodes that have generated preparation logs, where the deletion message is used to instruct the target storage nodes to delete the preparation logs. After receiving the deletion message, the target storage nodes that have generated preparation logs delete locally stored preparation logs, so that the target EC blocks of the target EC stripe are not written into any target storage node.

Particularly, if the faulty storage node is the primary node, a node group management module may specify a secondary node as a new primary node, and then re-execute steps 1 to 3.

Figure 3:
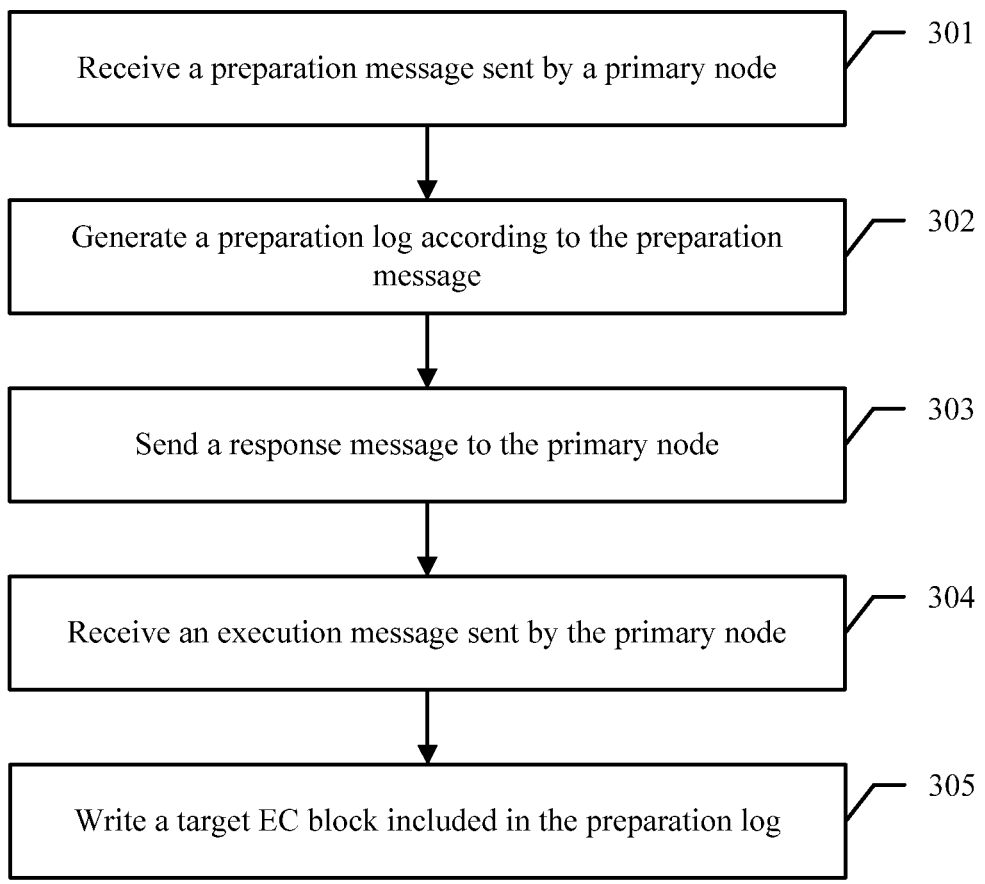
FIG. 3 is a flowchart of another embodiment of a data storage method according to an embodiment of the present invention.

In the foregoing embodiment, the data storage method provided by this embodiment of the present invention is described from the perspective of a primary node. In the following embodiment, the data storage method provided by this embodiment of the present invention is explained from the perspective of a secondary node. Referring to FIG. 3, a basic procedure of the method includes:

301. Receive a Preparation Message Sent by a Primary Node.

The primary node generates a target EC stripe, and determines m+k target storage nodes used to store the target EC stripe. The secondary node in this embodiment of the present invention is a node in the target storage nodes.

The secondary node receives a preparation message sent by a primary node, where the preparation message is sent when the primary node determines that the secondary node is a target storage node used to store a target EC block, and the preparation message includes the target EC block to be stored by the secondary node.

302. Generate a Preparation Log According to the Preparation Message.

After receiving the preparation message sent by the primary node, the secondary node generates a preparation log according to the preparation message, where the preparation log is stored on the secondary node locally. A purpose of the preparation log is mainly to temporarily store an EC block to be stored by the secondary node. Therefore, a storage location of the preparation log is not a final storage location of the target EC block. In an actual application, the preparation log may be a log or a data block, or in any other form, which is not limited in this embodiment, but the preparation log needs to include the target EC block carried in the preparation message. The preparation log includes the target EC block to be stored by the secondary storage node.

303. Send a Response Message to the Primary Node.

After generating the preparation log, the secondary node sends a response message to the primary node, where the response message is used to indicate that the secondary node has generated the preparation log according to the preparation message.

It may be understood that other target storage nodes in a storage node group also send response messages to the primary node.

304. Receive an Execution Message Sent by the Primary Node.

The secondary node receives an execution message sent by the primary node, where the execution message is sent after the primary node receives the response messages of all the target storage nodes, and the execution message is used to instruct to write the target EC block included in the preparation log.

305. Write a Target EC Block Included in the Preparation Log.

After receiving the execution message, the secondary node writes the target EC block carried in the preparation log.

In this embodiment, the data storage method provided by this embodiment of the present invention is described from the perspective of a secondary node. A secondary node receives a preparation message sent by a primary node, generates a preparation log according to the preparation message, sends a response message to the primary node, receives an execution message sent by the primary node, and writes a target EC block included in the preparation log according to the execution message. In the method provided by this embodiment, the secondary node does not directly write a to-be-stored target EC block, but first writes the to-be-stored target EC block into a locally generated preparation log, and after receiving the execution message sent by the primary node, writes the target EC block. Therefore, even if the secondary node is faulty in the process of writing the target EC block, the target EC block has been stored in the preparation log of the secondary node. In this way, it can be ensured that the target EC block is not lost regardless of whether the operation of writing the target EC block is successful. If none of target EC blocks on all target storage nodes determined by the primary node is lost, a case in which a part of the target storage nodes have target EC blocks of a target EC stripe but the other part of the target storage nodes do not have target EC blocks of the target EC stripe may be avoided, the target EC stripe can be stored consistently, and storage consistency of a distributed storage system is improved.

Preferably, in still another embodiment of the present invention, the preparation message sent by the primary node and received by the secondary node further includes a version number of the target EC stripe generated by the primary node, and further, the preparation log generated by the secondary node according to the preparation message also includes the version number of the target EC stripe. The secondary node also writes the version number of the target EC stripe when writing the target EC block according to the execution message.

Preferably, in still another embodiment of the present invention, to ensure that the preparation log generated is not lost when the secondary node is faulty, the secondary node may write the preparation log into a power failure protection medium.

In the embodiment shown in FIG. 1, it is mentioned in step 3 that, if the primary node determines that version numbers of the target EC stripe on the target storage nodes are different, the primary node sends a deletion message to the target storage nodes that have generated preparation logs. Therefore, preferably, in still another embodiment of the present invention, before step 304, the secondary node may further receive the deletion message sent by the primary node. After receiving the deletion message, the secondary node deletes the locally stored preparation log.

Figure 4:
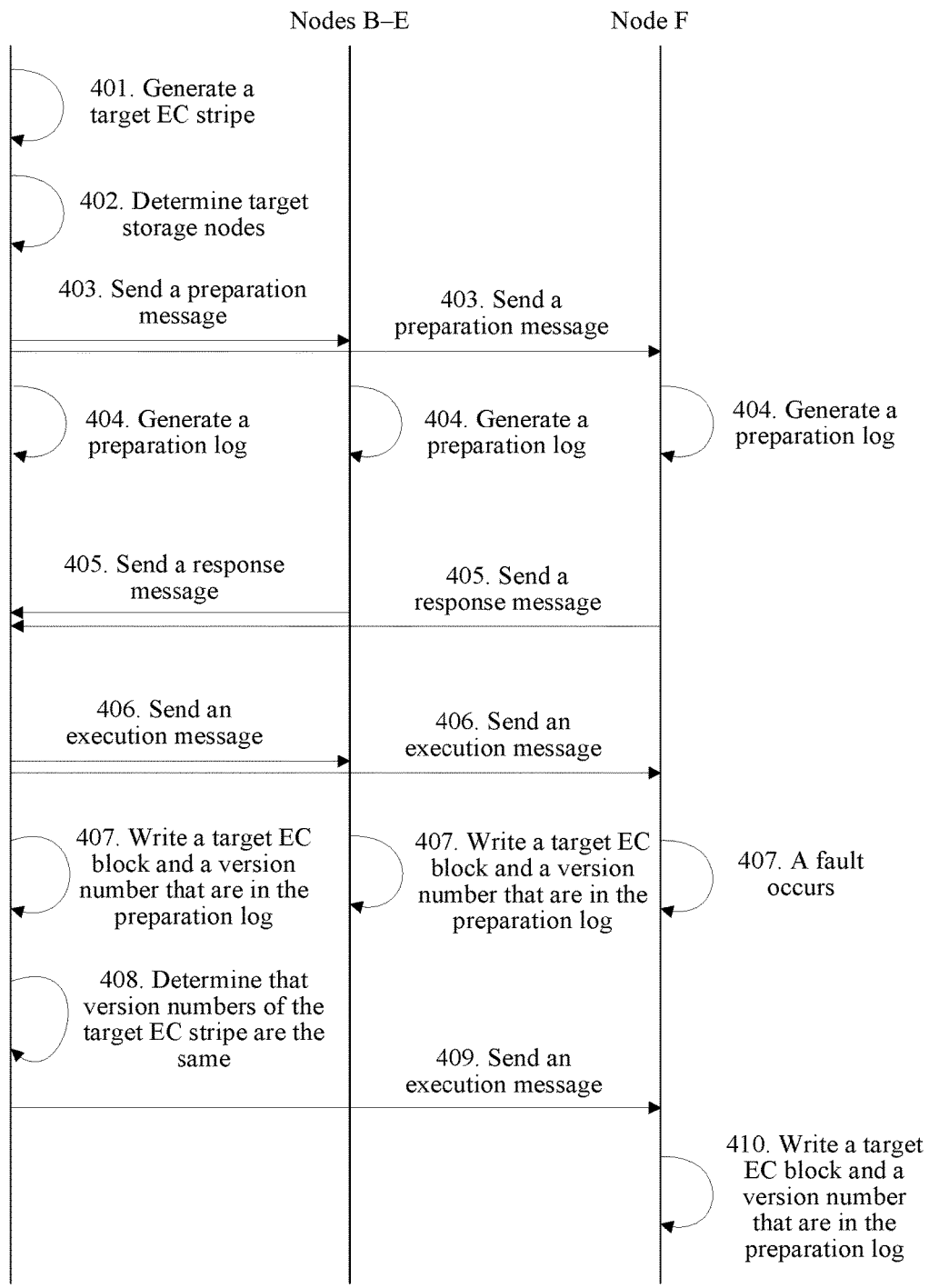
FIG. 4 is a flowchart of another embodiment of a data storage method according to an embodiment of the present invention.
Figure 5:
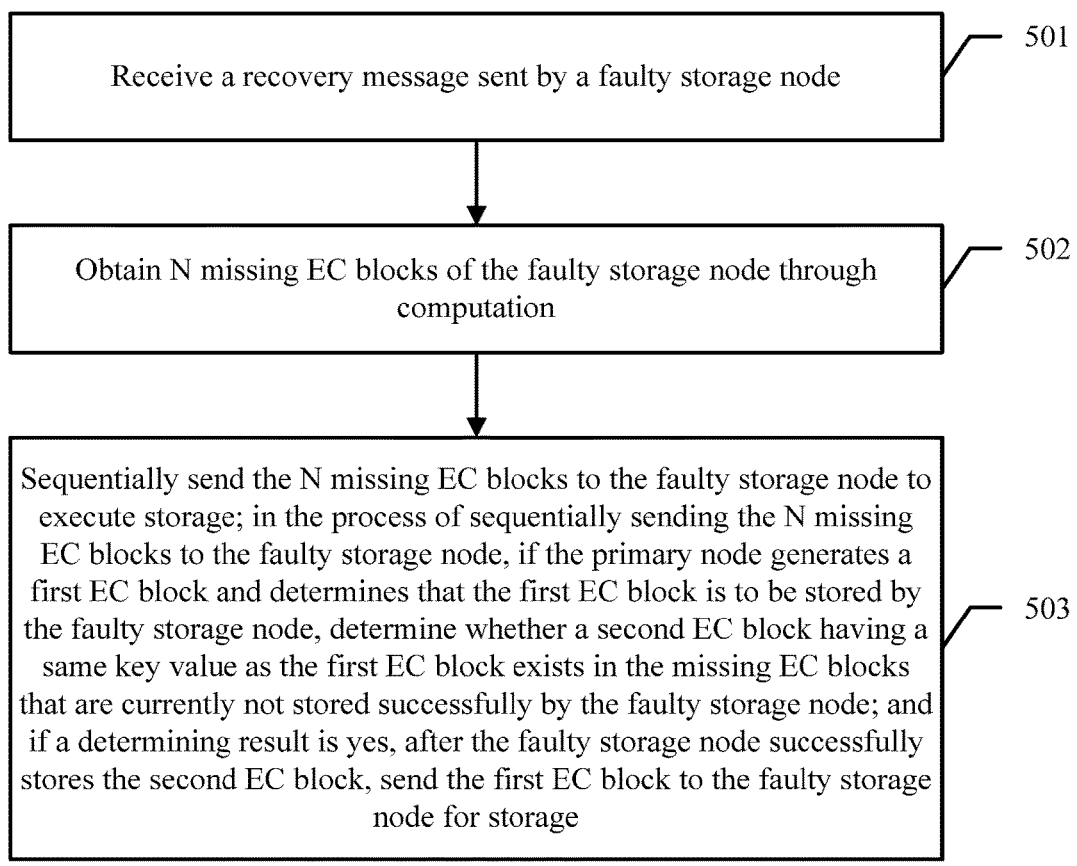
FIG. 5 is a flowchart of an embodiment of a data recovery method according to an embodiment of the present invention.

For ease of understanding the foregoing embodiment, the following uses a specific application scenario of the foregoing embodiment as an example for description. For a specific procedure, refer to FIG. 4.

The distributed storage system stores data in a form of an EC stripe, and each EC stripe includes four data blocks and two parity blocks. The distributed storage system includes 100 storage node groups. A storage node group 1 includes six storage nodes, where a primary node is a node A, and secondary nodes are a node B, a node C, a node D, a node E, and a node F.

401. Generate a target EC stripe. The node A receives a data segment delivered by a data delivery apparatus, and performs EC coding on the data segment to obtain the target EC stripe. A version number of the target EC stripe is 3, and an address range of a data part of the target EC stripe is 4M-8M.

402. Determine target storage nodes. The node A determines that target storage nodes used to store six EC blocks of the target EC stripe are the nodes A-F.

403. Send a preparation message. The node A sends a preparation message to the nodes A-F, where the preparation message sent to each node carries a target EC block and a version number of the target EC stripe, and the nodes A-F receive the preparation message.

404. Generate a preparation log. The nodes A-F generate preparation logs, where the preparation logs include target EC blocks to be stored and version numbers of the target EC stripe.

405. Send a response message. The nodes A-F send response messages to the node A after generating the preparation logs. The node A receives the response messages sent by the nodes A-F.

406. Send an execution message. After receiving the response messages sent by the nodes A-F, the node A sends an execution message to the nodes A-F, and the nodes A-F receive the execution message.

407. The nodes A-E write the target EC blocks and the version numbers that are in the preparation logs, and the node F is faulty. After the node A sends the execution message, the nodes A-E write the target EC blocks and the version numbers that are in the preparation logs, and the node F is faulty in the process of receiving the execution message.

408. Determine that the version numbers of the target EC stripe are the same. The node A determines that the node F is faulty, and therefore, after the node F is recovered from the fault, determines whether the version numbers of the target EC stripe on the nodes A-F are the same. The nodes A-E have no preparation log, and version numbers of the target EC stripe that are carried in stored target EC blocks are 3. The node F has a preparation log, and a version number of the target EC stripe that is carried in a target EC block in the preparation log is 3.

409. The node A sends an execution message to the node F. The node F receives the execution message.

410. The node F writes the target EC block and the version number that are in the preparation log.

It is mentioned in the foregoing embodiment that, if a target storage node is faulty, a data storage procedure needs to be executed after fault recovery of the faulty storage node. However, the fault may cause a loss of data on the faulty storage node. In this case, the primary node needs to obtain a lost EC block of the faulty storage node through computation by using an EC technology according to an EC block stored by another storage node in the storage node group, and then synchronize the EC block obtained through computation to the faulty storage node that is recovered. Therefore, an embodiment of the present invention provides a data recovery method, specifically including:

501. Receive a Recovery Message Sent by a Faulty Storage Node.

A faulty storage node exists in any storage node group in a distributed storage system. After the faulty storage node is recovered, the faulty storage node sends a recovery message to a primary node, where the recovery message is used to indicate that the faulty storage node has been recovered. The primary storage node receives the recovery message.

502. Obtain N Lost EC Blocks of the Faulty Storage Node Through Computation.

As mentioned above, the distributed storage system stores data in a form of an EC stripe by using an EC technology, one EC stripe includes m+k EC blocks, which are respectively stored in m+k storage nodes in a storage node group, and one EC stripe is tolerable to a loss of k EC blocks. Using an EC stripe A as an example, if an EC block of the EC stripe A is lost on the faulty storage node, the primary node may obtain the lost EC block of the faulty storage node through computation by using the EC technology according to other EC blocks of the EC stripe A that are stored by non-faulty nodes.

Therefore, in this embodiment, after receiving the recovery message, the primary node obtains the N lost EC blocks of the faulty storage node through computation according to EC blocks stored by non-faulty storage nodes (namely, storage nodes other than the faulty storage node) in a storage node group to which the primary node belongs.

As mentioned above, key values of multiple EC blocks stored on each storage node are different from each other, and therefore, the N lost EC blocks of the faulty storage node should carry different key values.

503. Sequentially send the N lost EC blocks to the faulty storage node to execute storage; in the process of sequentially sending the N lost EC blocks to the faulty storage node, if the primary node generates a first EC block and determines that the first EC block is to be stored by the faulty storage node, determine whether a second EC block having a same key value as the first EC block exists in the lost EC blocks that are currently not stored successfully by the faulty storage node; and if a determining result is yes, after the faulty storage node successfully stores the second EC block, send the first EC block to the faulty storage node to execute storage.

After obtaining the N lost EC blocks of the faulty storage node through computation, the primary node arranges the N lost EC blocks into a sending queue, and sequentially sends the N lost EC blocks to the faulty storage node.

In the process of sequentially sending the N lost EC blocks to the faulty storage node, if the primary node generates a new EC stripe again and determines that a first EC block in the new EC stripe is to be stored by the faulty storage node, the primary node determines whether a second EC block exists in the lost EC blocks that are currently not stored successfully by the faulty storage node, where the second EC block has a same key value as the first EC block.

It may be understood that, if the primary node directly sends, after generating the first EC block, the first EC block to the faulty storage node to execute storage, but the second EC block exists in the lost EC blocks that are currently not stored successfully by the faulty storage node, when the primary node continues to execute the operation of sequentially sending the N lost EC blocks to the faulty storage node, a case in which the second EC block overwrites data of the first EC block may be caused. To avoid replacing the new first EC block with the old second EC block, in this embodiment, if the primary node determines that the second EC block exists in the lost EC blocks that are currently not stored successfully by the faulty storage node, the primary node inserts the first EC block after the second EC block in the sending queue, that is, the primary node does not send the first EC block to the faulty storage node first, but after the faulty storage node successfully stores the second EC block, sends the first EC block to the faulty storage node to execute storage.

This embodiment provides a data recovery method, where after a faulty storage node is recovered, a primary node obtains N lost EC blocks of the faulty storage node through computation, and sequentially sends the N lost EC blocks to the faulty storage node to execute storage. In the process of sequentially sending the N lost EC blocks to the faulty storage node, if the primary node generates a new EC stripe again and determines that a first EC block in the new EC stripe is to be stored by the faulty storage node, the primary node determines whether a second EC block exists in the lost EC blocks that are currently not stored successfully by the faulty storage node, where the second EC block has a same key value as the first EC block. If it is determined that the second EC block exists, after the faulty storage node successfully stores the second EC block, the primary node sends the first EC block to the faulty storage node to execute storage. This method can avoid replacing new data with old data, and ensure that an EC block stored on the faulty storage node after recovery is a latest version.

In step 503, the primary node sequentially sends the N lost EC blocks to the faulty storage node to execute storage. Specifically, the primary node sends a first lost EC block in the N lost EC blocks to the faulty storage node first, and after sending an $n^{th}$ lost EC block to the faulty storage node, the primary node receives a response message corresponding to the $n^{th}$ lost EC block, where the response message is sent by the faulty storage node, and is used to indicate that the faulty storage node has successfully stored the $n^{th}$ lost EC block. After receiving the response message corresponding to the $n^{th}$ lost EC block, the primary node sends a next lost EC block to the faulty storage node again, where $1 \leq n \leq N$. That the primary node sequentially sends the N lost EC blocks to the faulty storage node may be summarized into the following steps:

Step 1: The primary node sends the $n^{th}$ lost EC block to the faulty storage node, where an initial value of n when the procedure starts is 1, and n is not greater than N.

Step 2: After sending the $n^{th}$ lost EC block to the faulty storage node, the primary node receives the response message corresponding to the $n^{th}$ lost EC block.

Step 3: After receiving the response message corresponding to the $n^{th}$ lost EC block, if n<N, the primary node adds 1 to the value of n, and re-executes step 1.

The primary node may send, by executing step 1 to step 3 cyclically, the N lost EC blocks to the faulty storage node to execute storage.

If a response message is used to indicate that the faulty storage node has successfully stored a lost EC block, that after the faulty storage node successfully stores the second EC block, the primary node sends the first EC block to the faulty storage node for storage in step 503 should be specifically: after sending the second EC block to the faulty storage node and receiving a response message sent by the faulty storage node with respect to the second EC block, the primary node sends the first EC block to the faulty storage node to execute storage.

In step 503, the primary node needs to determine whether the second EC block exists in the lost EC blocks that are currently not stored successfully by the faulty storage node in the N lost EC blocks. It may be understood that, the lost EC blocks that are currently not stored successfully by the faulty storage node should include the lost EC blocks that are not sent by the primary node to the faulty storage node currently and the lost EC blocks that are sent to the faulty storage node currently but response messages corresponding to which are not received.

As mentioned above, a logical volume of the distributed storage system may be divided into multiple logical partitions, and each logical partition is of a size of k data blocks and does not overlap each other. A unique key value is set for each logical partition of the distributed storage system, and a key value corresponding to a logical partition that each data segment falls within is a key value corresponding to the data segment. A data delivery apparatus adds the key value to the data segment and delivers the data segment to the primary node, where an EC stripe generated by the primary node according to the data segment has a same key value as the data segment, while a key value of the EC stripe is carried in EC blocks of the EC stripe. Therefore, it may be understood that a key value of a logical partition that each EC block falls within is a key value of the EC block.

For ease of understanding the foregoing embodiment, the following uses a specific application scenario of the foregoing embodiment for description.

The distributed storage system stores data in a form of an EC stripe, and each EC stripe includes four data blocks and two parity blocks. The distributed storage system includes 100 storage node groups. A storage node group 1 includes six storage nodes, where a primary node is a node A, and secondary nodes are a node B, a node C, a node D, a node E, and a node F. At a moment, the node F is faulty. Three hours later, the node F is recovered but data is lost.

The node F sends a recovery message to the node A, to notify the node A that the node F is recovered from the fault. The node A receives the recovery message.

After receiving the recovery message, the node A obtains 200 lost EC blocks of the node F through computation according to all EC blocks stored by the node A, node B, node C, node D, and node E.

The primary node sends a lost EC block to the node F each time, and after receiving a response message from the node F with respect to the lost EC block, sends a next lost EC block. In this way, the 200 lost EC blocks are sequentially sent to the node F.

After a $151^{st}$ lost EC block is sent to the node F, the node A generates a new EC stripe according to a data segment delivered by a data delivery apparatus, and determines that a first EC block in the new EC stripe is to be stored by the node F, where a key value of the first EC block is 25.

Because the node A has not received a response message sent by the node F with respect to the $151^{st}$ lost EC block, the node A determines whether a second EC block having a key value 25 exists in $151^{st}$-$200^{th}$ lost EC blocks. The node A determines that a key value of a $190^{th}$ lost EC block is 25.

The node A does not send the first EC block to the node F temporarily, and after sending the $190^{th}$ lost EC block to the node F and receiving a response message that is sent by the node F with respect to the $190^{th}$ lost EC block, sends the first EC block to the node F.

The node A sends all the 200 lost EC blocks to the node F, and the node F completes data recovery.

The foregoing embodiment provides a data storage or data recovery method provided by the embodiments of the present invention. A corresponding apparatus is provided below to implement the foregoing method.

An embodiment of the present invention provides a data storage apparatus, where the data storage apparatus is deployed on a primary storage node in any storage node group and specifically includes:

a data coding module 601, configured to receive a to-be-stored data segment, and perform EC coding on the to-be-stored data segment to obtain a target EC stripe, where a size of the to-be-stored data segment is not greater than Z, Z is a size of m data blocks, and the target EC stripe includes m+k target EC blocks, specifically including m target data blocks and k target parity blocks;

a node determining module 602, configured to determine, in a storage node group, m+k target storage nodes used to store the m+k target EC blocks, where each target storage node is configured to store one target EC block;

a message sending module 603, configured to send a preparation message to the m+k target storage nodes separately, where each preparation message includes a target EC block to be stored by each target storage node; and a message receiving module 604, configured to receive a response message sent by any target storage node of the m+k target storage nodes, where the response message is used to indicate that the target secondary storage node currently sending the response message has generated a preparation log according to the preparation message, and the preparation log includes a target EC block to be stored by the target storage node currently sending the response message, where the message sending module 603 is further configured to send an execution message to the m+k target storage nodes after the message receiving module 604 receives response messages of all the target storage nodes in the m+k target storage nodes, where the execution message is used to instruct the m+k target storage nodes to write the target EC blocks included in the preparation logs.

In the data storage apparatus provided by this embodiment, a data coding module 601 performs EC coding on a to-be-stored data segment to obtain a target EC stripe; a node determining module 602 determines, in secondary storage nodes in a storage node group, m+k target storage nodes used to store the m+k target EC blocks; a message sending module 603 sends a preparation message to the target storage nodes; a message receiving module 604 receives response messages sent by the target storage nodes; and the message sending module 603 sends an execution message to all target storage nodes after receiving response messages of all the target storage nodes, to instruct the target storage nodes to write target EC blocks that are in the preparation logs. By using the data storage apparatus provided by this embodiment, the m+k target storage nodes used to store the target EC stripe do not directly write the to-be-stored target EC blocks, but first write the to-be-stored target EC blocks into locally generated preparation logs, and after all the target storage nodes generate preparation logs, write the target EC blocks. A target storage node executes an operation of writing a target EC block into a correct location only in a case in which all the target storage nodes have generated preparation logs. Even if a fault occurs in the process of writing the target EC block by the target storage node, the target EC block has been stored in a preparation log of the target storage node. In this way, it can be ensured that the target EC block is not lost regardless of whether the operation of writing the target EC block is successful. Therefore, a case in which a part of the target storage nodes have target EC blocks of the target EC stripe but the other part of the target storage nodes do not have target EC blocks of the target EC stripe is avoided, the target EC stripe can be stored consistently, and storage consistency of a distributed storage system is improved.

Preferably, in still another embodiment of the present invention, to ensure that a preparation log generated by a target storage node is not lost when the target storage node is faulty, the target storage node may write the preparation log into a power failure protection medium.

Preferably, in still another embodiment of the present invention, the preparation message sent by the primary node to a target storage node further includes a version number of the target EC stripe, and further, the preparation log generated by the target storage node according to the preparation message also includes the version number of the target EC stripe. The execution message specifically instructs the m+k target storage nodes to write the target EC blocks and the version number of the target EC stripe that are in the preparation logs.

Preferably, in still another embodiment of the present invention, the data storage apparatus may further include a version determining module 605, configured to: when it is detected that a faulty storage node exists in the m+k target storage nodes, after fault recovery of the faulty storage node, determine whether version numbers of the target EC stripe on the m+k target storage nodes are the same, where the version numbers of the target EC stripe on the m+k target storage nodes include version numbers of the target EC stripe in preparation logs on target storage nodes that have generated preparation logs and/or version numbers of the target EC stripe stored by target storage nodes that have no preparation log. The message sending module 603 is specifically configured to: if the version numbers of the target EC stripe on all the target storage nodes in the m+k target storage nodes are the same, send an execution message to the target storage nodes that have generated preparation logs; and if the version numbers of the target EC stripe on the target storage nodes in the m+k target storage nodes are different, send a deletion message to the target storage nodes that have generated preparation logs, where the deletion message is used to instruct the target storage nodes to delete the preparation logs.

Figure 7:
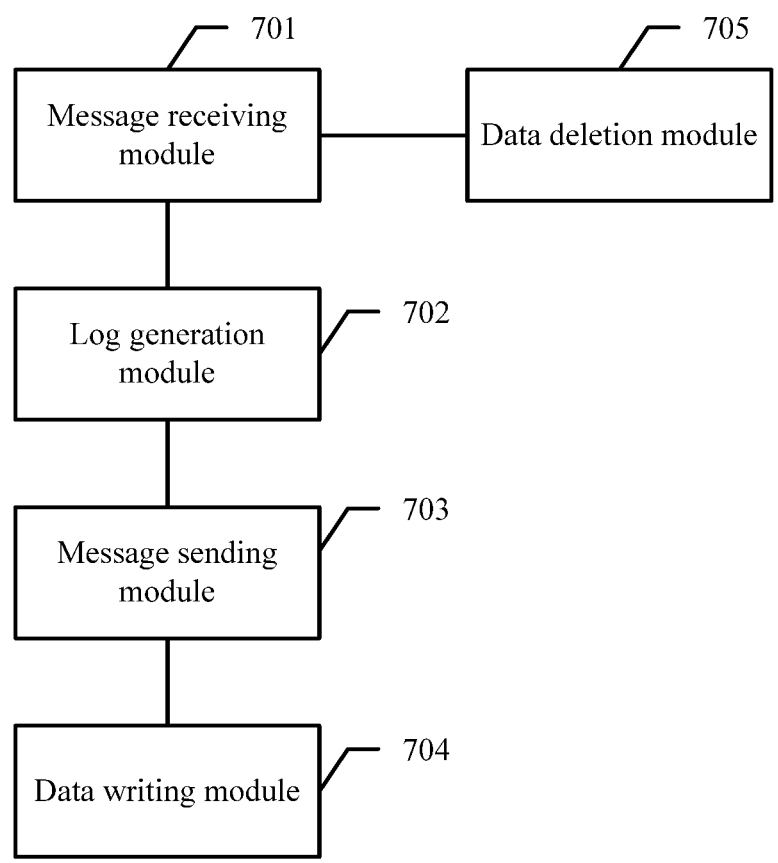
FIG. 7 is a structural diagram of another embodiment of a data storage apparatus according to an embodiment of the present invention.

An embodiment of the present invention further provides a data storage apparatus, deployed on a secondary node. Referring to FIG. 7, a structure of the data storage apparatus includes:

a message receiving module 701, configured to receive a preparation message sent by a primary storage node, where the preparation message includes a target EC block to be stored by the secondary storage node in which the data storage apparatus is located;

a log generation module 702, configured to generate a preparation log according to the preparation message, where the preparation log includes the target EC block to be stored by the secondary storage node;

a message sending module 703, configured to send a response message to the primary storage node, where the response message is used to indicate that the secondary storage node has generated the preparation log according to the preparation message, where the message receiving module 701 is further configured to receive an execution message sent by the primary storage node; and a data writing module 704, configured to write the target EC block included in the preparation log according to the execution message.

In the data storage apparatus provided by this embodiment, a message receiving module 701 receives a preparation message sent by a primary node; a log generation module 702 generates a preparation log according to the preparation message; a message sending module 703 sends a response message to the primary node; the message receiving module 701 receives an execution message sent by the primary node; and a data writing module 704 writes a target EC block included in the preparation log according to the execution message. The data storage apparatus provided by this embodiment does not directly write a to-be-stored target EC block, but first writes the to-be-stored target EC block into a locally generated preparation log, and after receiving the execution message sent by the primary node, writes the target EC block. Therefore, even if the secondary node is faulty in the process of writing the target EC block, the target EC block has been stored in the preparation log of the secondary node. In this way, it can be ensured that the target EC block is not lost regardless of whether the operation of writing the target EC block is successful. If none of target EC blocks on all target storage nodes determined by the primary node is lost, a case in which a part of the target storage nodes have target EC blocks of a target EC stripe but the other part of the target storage nodes do not have target EC blocks of the target EC stripe may be avoided, the target EC stripe can be stored consistently, and storage consistency of a distributed storage system is improved.

Preferably, in still another embodiment of the present invention, the target EC block to be stored by the secondary storage node is a data block or a parity block in the target EC stripe generated by the primary storage node, the preparation message further includes a version number of the target EC stripe generated by the primary node, and further, the preparation log generated by the secondary node according to the preparation message also includes the version number of the target EC stripe. The secondary node also writes the version number of the target EC stripe when writing the target EC block according to the execution message.

Preferably, in still another embodiment of the present invention, the message receiving module 701 is further configured to receive a deletion message sent by the primary storage node; and the data storage apparatus may further include a data deletion module 705, configured to delete the preparation log according to the deletion message.

Figure 6:
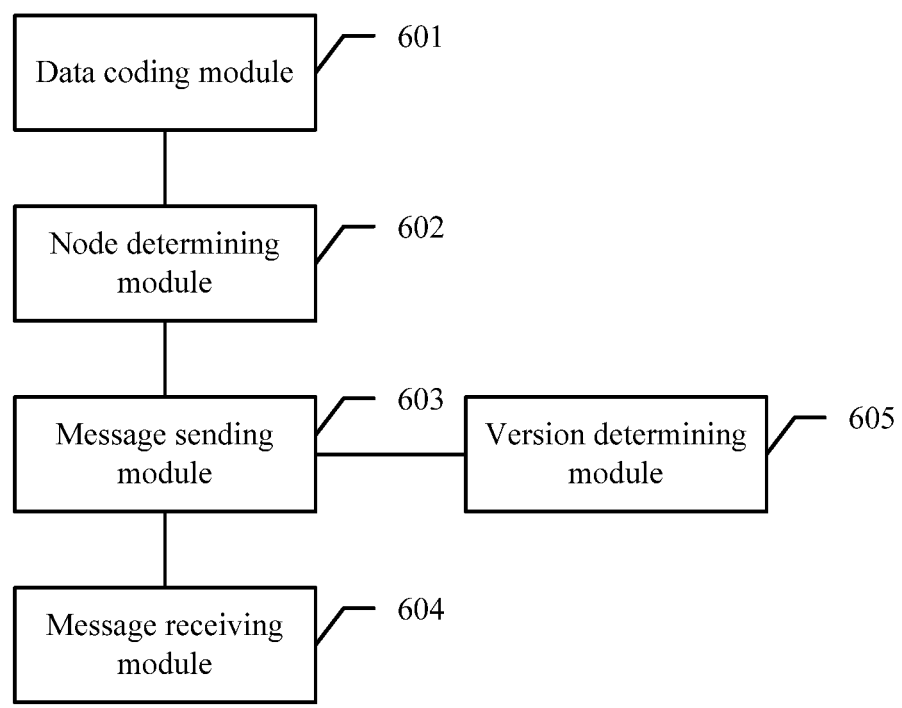
FIG. 6 is a structural diagram of an embodiment of a data storage apparatus according to an embodiment of the present invention.

It may be understood that, whether an identity of a storage node is a primary node or a secondary node may be set freely, and one storage node may be a primary node in a storage node group and also a secondary node in another storage node group. Therefore, the data storage apparatuses shown in FIG. 6 and FIG. 7 may be located on a same storage node.

For ease of understanding the foregoing embodiment, the following uses a specific application scenario of the foregoing embodiment as an example for description. For a specific procedure, still refer to FIG. 4:

The distributed storage system stores data in a form of an EC stripe, and each EC stripe includes four data blocks and two parity blocks. The distributed storage system includes 100 storage node groups. A storage node group 1 includes six storage nodes, where a primary node is a node A, and secondary nodes are a node B, a node C, a node D, a node E, and a node F.

401. Generate a target EC stripe. The node A receives a data segment delivered by a data delivery apparatus, and a data coding module of the node A performs EC coding on the data segment to obtain the target EC stripe. A version number of the target EC stripe is 3, and an address range of a data part of the target EC stripe is 4M-8M.

402. Determine target storage nodes. A node determining module of the node A determines that target storage nodes used to store six EC blocks of the target EC stripe are the nodes A-F.

403. Send a preparation message. A message sending module of the node A sends a preparation message to the nodes A-F, where the preparation message sent to each node carries a target EC block and a version number of the target EC stripe, and message receiving modules of the nodes A-F receive the preparation message.

404. Generate a preparation log. Log generation modules of the nodes A-F generate preparation logs, where the preparation logs include target EC blocks to be stored and version numbers of the target EC stripe.

405. Send a response message. Message sending modules of the nodes A-F send response messages to the node A after generating the preparation logs. The message receiving module of the node A receives the response messages sent by the nodes A-F.

406. Send an execution message to the nodes A-F. After receiving the response messages sent by the nodes A-F, the message sending module of the node A sends an execution message to the nodes A-F, and the message receiving modules of the nodes A-F receive the execution message.

407. The nodes A-E write the target EC blocks and the version numbers that are in the preparation logs and the node F is faulty. After the node A sends the execution message, data writing modules of the nodes A-E write the target EC blocks and the version numbers that are in the preparation logs, and the node F is faulty in the process of receiving the execution message.

408. Determine that the version numbers of the target EC stripe are the same. The node A determines that the node F is faulty, and therefore, after the node F is recovered from the fault, a version determining module of the node A determines whether the version numbers of the target EC stripe on the nodes A-F are the same. The nodes A-E have no preparation log, and version numbers of the target EC stripe that are carried in stored target EC blocks are 3. The node F has a preparation log, and a version number of the target EC stripe that is carried in a target EC block in the preparation log is 3.

409. The message sending module of the node A sends an execution message to the node F. The message receiving module of the node F receives the execution message.

410. The data writing module of the node F writes the target EC block and the version number that are in the preparation log.

Figure 8:
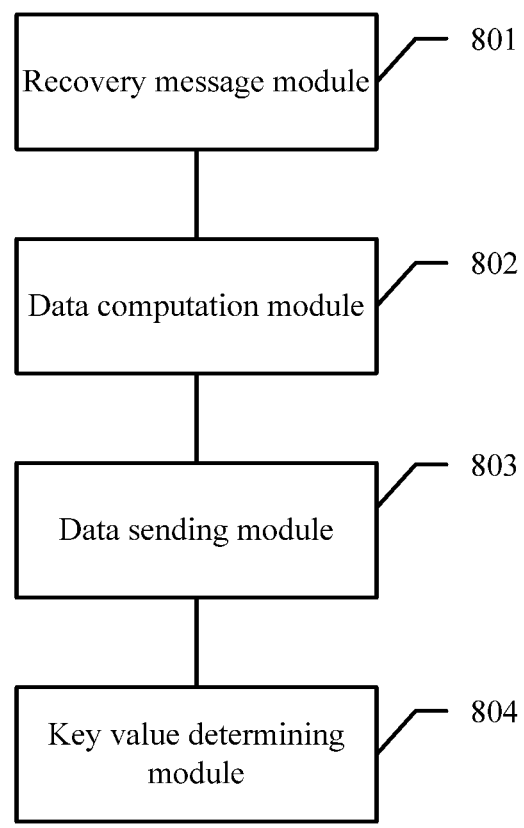
FIG. 8 is a structural diagram of another embodiment of a data recovery apparatus according to an embodiment of the present invention.

An embodiment of the present invention further provides a data recovery apparatus, configured to recover lost data of a faulty storage node, where the data recovery apparatus is deployed on a primary storage node of a storage node group to which the faulty storage node belongs. Referring to FIG. 8, a specific structure of the data recovery apparatus includes:

a recovery message module 801, configured to: after fault recovery of the faulty storage node, receive a recovery message sent by the faulty storage node, where the recovery message is used to indicate that the faulty storage node is recovered from the fault;

a data computation module 802, configured to obtain N lost EC blocks of the faulty storage node through computation according to EC blocks stored by non-faulty storage nodes in a storage node group to which the faulty storage node belongs, where N is a positive integer;

a data sending module 803, configured to sequentially send the N lost EC blocks to the faulty storage node to execute storage; and a key value determining module 804, configured to: in the process of sequentially sending the N lost EC blocks to the faulty storage node, if the primary storage node generates a first EC block and determines that the first EC block is to be stored by the faulty storage node, determine whether a second EC block having a same key value as the first EC block exists in the lost EC blocks that are currently not stored successfully by the faulty storage node, where the data sending module 803 is further configured to: if the second EC block exists in the lost EC blocks that are currently not stored successfully by the faulty storage node, after the faulty storage node successfully stores the second EC block, send the first EC block to the faulty storage node to execute storage.

This embodiment provides a data recovery apparatus, where a data computation module 802 obtains N lost EC blocks of a faulty storage node through computation after the faulty storage node is recovered; and a data sending module 803 sequentially sends the N lost EC blocks to the faulty storage node to execute storage. In the process of sequentially sending the N lost EC blocks to the faulty storage node, if a primary node generates a new EC stripe and determines that a first EC block in the new EC stripe is to be stored by the faulty storage node, a key value determining module 804 determines whether a second EC block exists in the lost EC blocks that are currently not stored successfully by the faulty storage node, where the second EC block has a same key value as the first EC block. If it is determined that the second EC block exists, after the faulty storage node successfully stores the second EC block, the data sending module 803 sends the first EC block to the faulty storage node to execute storage. This method can avoid replacing new data with old data, and ensure that an EC block stored on the faulty storage node after recovery is a latest version.

Preferably, in still another embodiment of the present invention, the data sending module 803 is specifically configured to:

send an $n^{th}$ lost EC block to the faulty storage node, where $1 \leq n \leq N$;

receive a response message corresponding to the $n^{th}$ lost EC block, where the response message is sent by the faulty storage node, and the response message is used to indicate that the faulty storage node has successfully stored the $n^{th}$ lost EC block; and after receiving the response message of the faulty storage node with respect to the $n^{th}$ lost EC block, if n<N, add 1 to a value of n, and re-execute the step of sending an $n^{th}$ lost EC block to the faulty storage node.

Preferably, in still another embodiment of the present invention, the lost EC blocks that are currently not stored successfully include the lost EC blocks that are not sent to the faulty storage node currently and the lost EC blocks that are sent to the faulty storage node currently but response messages corresponding to which are not received.

Preferably, in still another embodiment of the present invention, a logical volume of a distributed storage system includes multiple logical partitions, each logical partition is of a size of k data blocks and does not overlap each other, each logical partition uniquely corresponds to one key value, and a key value of a logical partition that each EC block falls within is a key value of the EC block.

For ease of understanding the foregoing embodiment, the following uses a specific application scenario of the foregoing embodiment for description.

The distributed storage system stores data in a form of an EC stripe, and each EC stripe includes four data blocks and two parity blocks. The distributed storage system includes 100 storage node groups. A storage node group 1 includes six storage nodes, where a primary node is a node A, and secondary nodes are a node B, a node C, a node D, a node E, and a node F. At a moment, the node F is faulty. Three hours later, the node F is recovered but data is lost.

The node F sends a recovery message to the node A, to notify the node A that the node F is recovered from the fault. A recovery message module 801 of the node A receives the recovery message.

After the node A receives the recovery message, a data computation module 802 obtains 200 lost EC blocks of the node F through computation according to all EC blocks stored by the node A, node B, node C, node D, and node E.

A data sending module 803 of the node A sends a lost EC block to the node F each time, and after receiving a response message from the node F with respect to the lost EC block, sends a next lost EC block. In this way, the 200 lost EC blocks are sequentially sent to the node F.

After the data sending module 803 sends a $151^{st}$ lost EC block to the node F, the node A generates a new EC stripe according to a data segment delivered by a data delivery apparatus, and determines that a first EC block in the new EC stripe is to be stored by the node F, where a key value of the first EC block is 25.

Because the node A has not received a response message sent by the node F with respect to the $151^{st}$ lost EC block, a key value determining module 804 of the node A determines whether a second EC block having a key value 25 exists in $151^{st}$-$200^{th}$ lost EC blocks. The node A determines that a key value of a $190^{th}$ lost EC block is 25.

The data sending module 803 of the node A does not send the first EC block to the node F temporarily, and after sending the $190^{th}$ lost EC block to the node F and receiving the response message sent by the node F with respect to the $190^{th}$ lost EC block, sends the first EC block to the node F.

The data sending module 803 of the node A sends all the 200 lost EC blocks to the node F, and the node F completes data recovery.

Each apparatus in the embodiments of the present invention is described above from the perspective of a modular functional entity. The following describes an apparatus in an embodiment of the present invention from the perspective of hardware processing.

Figure 9:
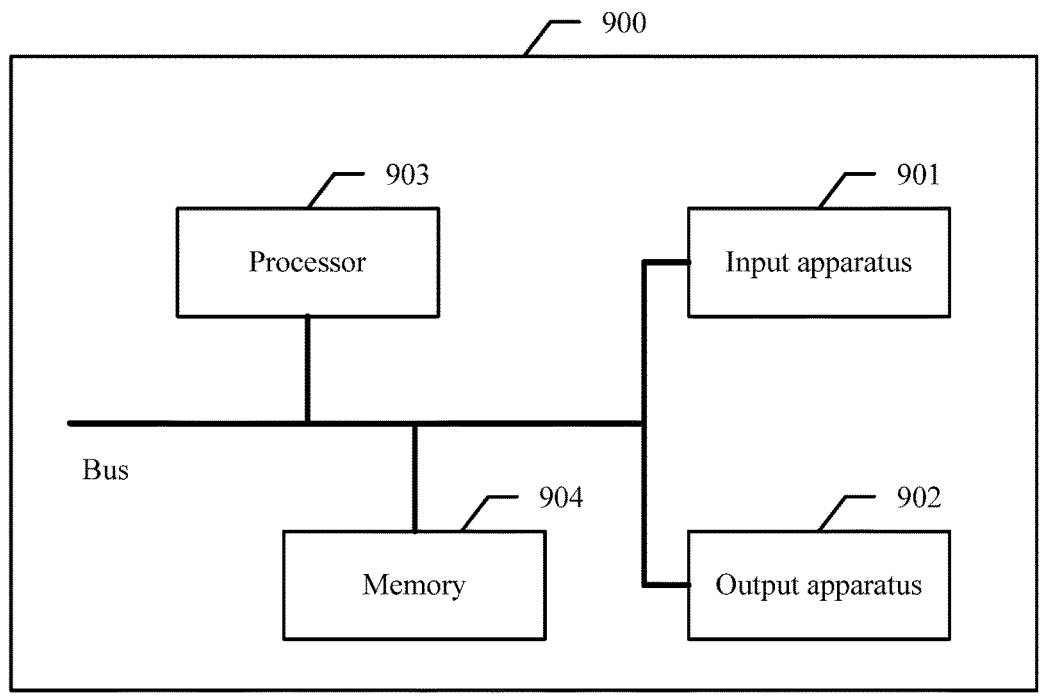
FIG. 9 is a structural diagram of another embodiment of a data storage apparatus according to an embodiment of the present invention.

Referring to FIG. 9, another embodiment of a data storage apparatus provided by an embodiment of the present invention includes:

an input apparatus 901, an output apparatus 902, a processor 903, and a memory 904 (the data storage apparatus 900 may include one or more processors 903, and one processor 903 is used as an example in FIG. 9). In some embodiments of the present invention, the input apparatus 901, the output apparatus 902, the processor 903, and the memory 904 may be connected by a bus or in other manners, where the connection by a bus is used as an example in FIG. 9.

By invoking an operation instruction stored in the memory 904, the processor 903 is configured to execute the following steps:

receiving a to-be-stored data segment, and performing EC coding on the to-be-stored data segment to obtain a target EC stripe, where a size of the to-be-stored data segment is not greater than Z, Z is a size of m data blocks, the target EC stripe includes m+k target EC blocks, and the m+k target EC blocks include m target data blocks and k target parity blocks;

determining m+k target storage nodes, where the m+k target storage nodes are configured to store the m+k target EC blocks, and each target storage node stores one of the target EC blocks;

sending a preparation message to the m+k target storage nodes separately, where each preparation message includes a target EC block to be stored by each target storage node;

receiving a response message sent by any target storage node of the m+k target storage nodes, where the response message is used to indicate that the target secondary storage node currently sending the response message has generated a preparation log according to the preparation message, and the preparation log includes a target EC block to be stored by the target storage node currently sending the response message; and after receiving response messages of all the target storage nodes in the m+k target storage nodes, sending an execution message to the m+k target storage nodes, where the execution message is used to instruct the m+k target storage nodes to write the target EC blocks included in the preparation logs.

In some embodiments of the present invention, the preparation message further includes a version number of the target EC stripe;

the preparation log generated by the target secondary storage node according to the preparation message further includes the version number of the target EC stripe; and the execution message is specifically used to instruct the target storage node to write the target EC blocks and the version number of the target EC stripe that are in the preparation message.

In some embodiments of the present invention, the processor 903 further executes the following steps:

if it is detected that a faulty storage node exists in the m+k target storage nodes, after fault recovery of the faulty storage node, determining whether version numbers of the target EC stripe on the m+k target storage nodes are the same, where the version numbers of the target EC stripe on the m+k target storage nodes include version numbers of the target EC stripe in preparation logs on target storage nodes that have generated preparation logs and/or version numbers of the target EC stripe stored by target storage nodes that have no preparation log; and if the version numbers of the target EC stripe on all the target storage nodes in the m+k target storage nodes are the same, sending an execution message to the target storage nodes that have generated preparation logs, where the execution message is used to instruct the target storage nodes to write the target EC blocks included in the preparation logs.

In some embodiments of the present invention, the processor 903 further executes the following steps:

if the version numbers of the target EC stripe on the target storage nodes in the m+k target storage nodes are different, sending a deletion message to the target storage nodes that have generated preparation logs, where the deletion message is used to instruct the target storage nodes to delete the preparation logs.

Figure 10:
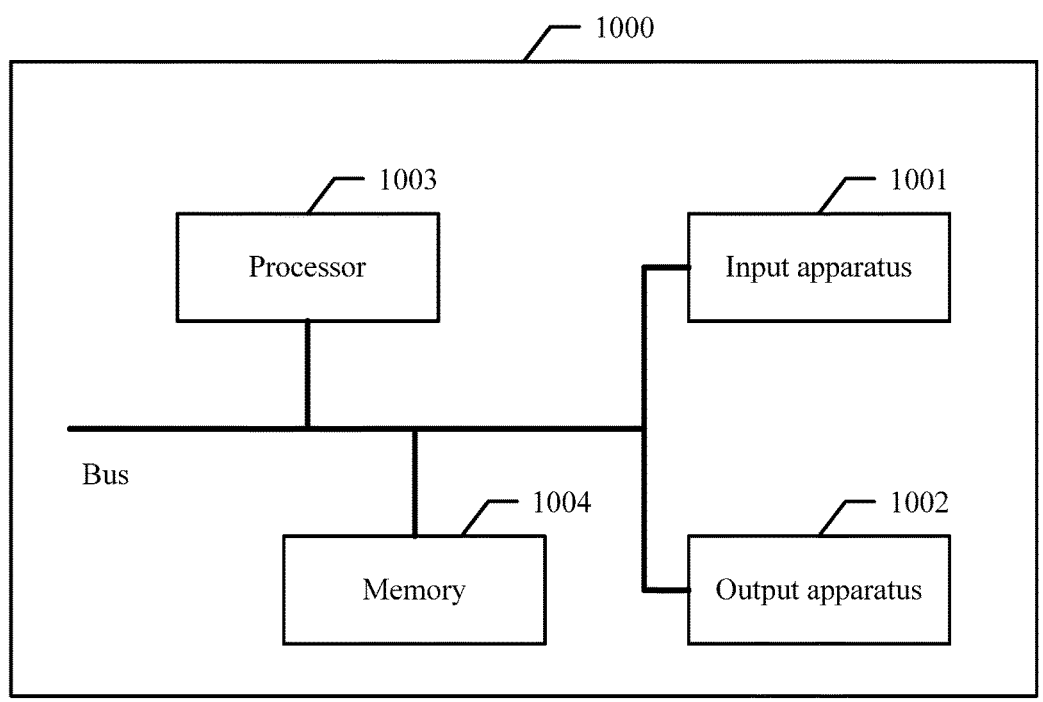
FIG. 10 is a structural diagram of another embodiment of a data storage apparatus according to an embodiment of the present invention.

Referring to FIG. 10, another embodiment of a data storage apparatus provided by an embodiment of the present invention includes:

an input apparatus 1001, an output apparatus 1002, a processor 1003, and a memory 1004 (the data storage apparatus 1000 may include one or more processors 1003, and one processor 1003 is used as an example in FIG. 10). In some embodiments of the present invention, the input apparatus 1001, the output apparatus 1002, the processor 1003, and the memory 1004 may be connected by a bus or in other manners, where the connection by a bus is used as an example in FIG. 10.

By invoking an operation instruction stored in the memory 1004, the processor 1003 is configured to execute the following steps:

receiving a preparation message sent by a primary storage node, where the preparation message includes a target EC block to be stored by a secondary storage node;

generating a preparation log according to the preparation message, where the preparation log includes the target EC block to be stored by the secondary storage node;

sending a response message to the primary storage node, where the response message is used to indicate that the secondary storage node has generated the preparation log according to the preparation message;

receiving an execution message sent by the primary storage node; and writing the target EC block included in the preparation log according to the execution message.

In some embodiments of the present invention, the target EC block to be stored by the secondary storage node is a data block or a parity block in a target EC stripe generated by the primary storage node, and the preparation message further includes a version number of the target EC stripe;

the preparation log generated by the secondary storage node according to the preparation message further includes the version number of the target EC stripe; and the execution message is specifically used to instruct the target storage node to write the target EC block and the version number of the target EC stripe that are in the preparation log.

In some embodiments of the present invention, the processor 1003 further executes the following steps:

receiving a deletion message sent by the primary storage node; and deleting the preparation log according to the deletion message.

Figure 11:
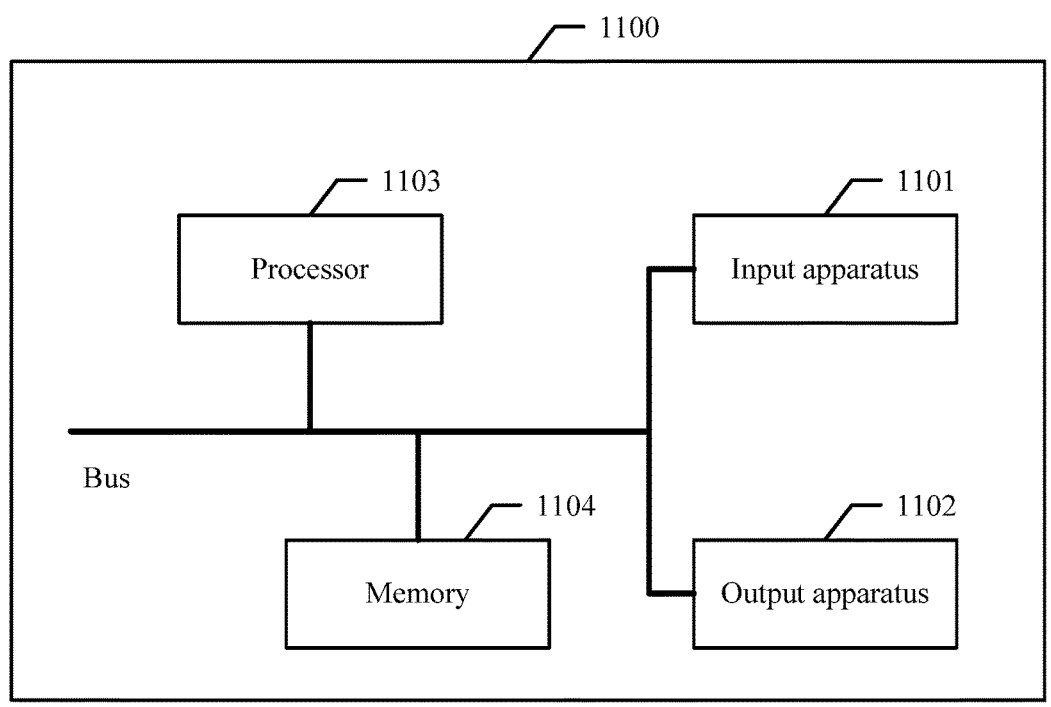
FIG. 11 is a structural diagram of another embodiment of a data recovery apparatus according to an embodiment of the present invention.

Referring to FIG. 11, another embodiment of a data recovery apparatus provided by an embodiment of the present invention includes:

an input apparatus 1101, an output apparatus 1102, a processor 1103, and a memory 1104 (the data recovery apparatus 1100 may include one or more processors 1103, and one processor 1103 is used as an example in FIG. 11). In some embodiments of the present invention, the input apparatus 1101, the output apparatus 1102, the processor 1103, and the memory 1104 may be connected by a bus or in other manners, where the connection by a bus is used as an example in FIG. 11.

By invoking an operation instruction stored in the memory 1104, the processor 1103 is configured to execute the following steps:

after fault recovery of a faulty storage node, receiving a recovery message sent by the faulty storage node;

obtaining N lost EC blocks of the faulty storage node through computation according to EC blocks stored by non-faulty storage nodes in a storage node group to which the faulty storage node belongs, where the N is a positive integer;

sequentially sending the N lost EC blocks to the faulty storage node to execute storage;

in the process of sequentially sending the N lost EC blocks to the faulty storage node, if the primary storage node generates a first EC block and determines that the first EC block is to be stored by the faulty storage node, determining whether a second EC block having a same key value as the first EC block exists in the lost EC blocks that are currently not stored successfully by the faulty storage node; and if it is determined that the second EC block exists, after the faulty storage node successfully stores the second EC block, sending the first EC block to the faulty storage node to execute storage.

In some embodiments of the present invention, the processor 1103 further executes the following steps:

sending an $n^{th}$ lost EC block to the faulty storage node, where $1 \leq n \leq N$;

receiving a response message corresponding to the $n^{th}$ lost EC block, where the response message is sent by the faulty storage node, and the response message is used to indicate that the faulty storage node has successfully stored the $n^{th}$ lost EC block; and after receiving the response message of the faulty storage node with respect to the $n^{th}$ lost EC block, if n<N, adding 1 to a value of n, and re-executing the step of sending an $n^{th}$ lost EC block to the faulty storage node.

In some embodiments of the present invention, the lost EC blocks that are currently not stored successfully include the lost EC blocks that are not sent to the faulty storage node currently and the lost EC blocks that are sent to the faulty storage node currently but response messages corresponding to which are not received.

In some embodiments of the present invention, a logical volume of the distributed storage system includes multiple logical partitions, each logical partition is of a size of k data blocks and does not overlap each other, each logical partition uniquely corresponds to one key value, and a key value of a logical partition that each EC block falls within is a key value of the EC block.

An embodiment of the present invention further provides a storage node, including the apparatus shown in any one or more of FIG. 6 to FIG. 11.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of the present invention. The foregoing storage medium includes: any medium that can store program coding, such as a USB flash drive, a removable hard disk, a read-only memory (ROM), a random access memory (RAM), a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A data storage method for use in a distributed storage system, wherein a storage node group of the distributed storage system comprises a plurality of storage nodes, in which one storage node is a primary storage node and others are secondary storage nodes, wherein the data storage method is performed by the primary storage node, and the method comprises:

receiving a data segment;

performing erasure coding (EC) on the data segment to obtain an EC stripe, wherein the EC strip comprises m data blocks and k parity blocks, m and k are non-zero integers;

sending a preparation message to each of m+k storage nodes in the storage node group, wherein a preparation message to a storage node comprises a data block or a parity block of the EC strip that is to be stored in the storage node;

receiving a response message from each of the m+k storage nodes, wherein a response message from a storage node indicates that the storage node has generated a preparation log according to the received preparation message, and the preparation log comprises the data block or the parity block of the EC strip that is to be stored in the storage node; and sending an execution message to each of the m+k storage nodes, wherein the execution message instructs each of the storage nodes to store the data block or the parity block of the EC strip it received from the primary storage node.

2. The data storage method according to claim 1, wherein:

the preparation message to each of the storage nodes further comprises a version number of the EC stripe;

the preparation log generated by each of the storage nodes further comprises the version number of the EC stripe; and the execution message further instructs each of the storage nodes to store the version number of the EC stripe.

3. The data storage method according to claim 2, wherein after the execution message is sent to each of the m+k storage nodes, a fault occurred in one of the storage nodes, and the faulty storage node fails to store the data block or the parity block of the EC strip it received from the primary storage node; and wherein the method further comprises:

after the faulty storage node is recovered, sending a second execution message to the recovered storage node, wherein the second execution message instructs the recovered storage node to store the data block or parity block of the EC strip it received from the primary storage node.

4. The data storage method according to claim 2, wherein the method further comprises:

receiving an update on the data segment;

obtaining an updated EC stripe that comprises m updated data blocks and k updated parity blocks; and sending an update preparation message to each of the m+k storage nodes in the storage node group, wherein an update preparation message to a storage node comprises a data block or parity block of the updated EC strip that is to be stored in the storage node and a version number of the updated EC strip.

5. The data storage method according to claim 4, further comprising:

receiving an update response message from each of the m+k storage nodes except a faulty storage node, wherein an update response message from a non-faulty storage node indicates that the non-faulty storage node has generated a preparation log according to the received update preparation message, and the preparation log comprises the data block or parity block of the updated EC strip that is to be stored in the non-faulty storage node and the version number of the updated EC strip, and wherein the faulty storage node fails to generate a preparation log;

after the faulty storage node is recovered, determining that the version number of the EC stripe stored in the recovered storage node is not the same as the version number of the updated EC stripe in the preparation log generated by each of the non-faulty storage nodes; and sending a deletion message to each of the non-faulty storage nodes, wherein the deletion message instructs each of the non-faulty storage nodes to delete the preparation log generated in response to the update preparation message.

6. The data storage method according to claim 3, further comprising:

receiving a recovery message from the faulty storage node after faulty storage node is recovered;

according to EC blocks that are stored in non-faulty storage nodes in the storage node group, determining one or more EC blocks that were stored in the faulty storage node and that were lost; and sequentially sending the one or more lost EC blocks to the recovered storage node for storage.

7. The data storage method according to claim 6, wherein in sequentially sending the one or more lost EC blocks to the recovered storage node for storage, when the primary storage node generates a first EC block that is to be stored by the recovered storage node, the primary storage node determines whether there is a second EC block having a same key value as the first EC block that was sent to the recovered storage node before the fault occurred and that was not stored, when it is determined that there is the second EC block, the primary storage node sends the first EC block to the recovered storage node for storage after the recovered storage node successfully stores the second EC block.

8. The data recovery method according to claim 6, wherein sequentially sending the one or more lost EC blocks to the recovered storage node for storage comprises:

sending a lost EC block to the recovered storage node;

receiving a response message from the recovered storage node corresponding to the lost EC block, wherein the response message indicates that the recovered storage node has successfully stored the lost EC block; and after receiving the response message, sending a next lost EC block to the recovered storage node.

9. An apparatus in a storage node group of a distributed storage system, comprising:

an input/output interface, a processor, and a memory storing instructions for execution by the processor;

wherein the instructions, when executed by the processor, cause the apparatus to perform a process that comprises:

receiving a data segment;

performing erasure coding (EC) on the data segment to obtain an EC stripe, wherein the EC strip comprises m data blocks and k parity blocks, m and k are non-zero integers;

sending a preparation message to each of m+k storage nodes in the storage node group, wherein a preparation message to a storage node comprises a data block or a parity block of the EC strip that is to be stored in the storage node;

receiving a response message from each of the m+k storage nodes, wherein a response message from a storage node indicates that the storage node has generated a preparation log according to the received preparation message, and the preparation log comprises the data block or the parity block of the EC strip that is to be stored in the storage node; and sending an execution message to each of the m+k storage nodes, wherein the execution message instructs each of the storage nodes to store the data block or the parity block of the EC strip it received from the apparatus.

10. The apparatus according to the claim 9, wherein
the preparation message to each of the storage nodes further comprises a version number of the EC stripe;
the preparation log generated by each of the storage nodes further comprises the version number of the EC stripe; and
the execution message further instructs each of the storage nodes to store the version number of the EC stripe.

11. The apparatus according to claim 10, wherein after the execution message is sent to each of the m+k storage nodes, a fault occurred in one of the storage nodes, and the faulty storage node fails to store the data block or the parity block of the EC strip it received from the apparatus; and wherein the process further comprises:

after the faulty storage node is recovered, sending a second execution message to the recovered storage node, wherein the second execution message instructs the recovered storage node to store the data block or parity block of the EC strip it received from the apparatus.

12. The apparatus according to claim 10, wherein the process further comprises:

receiving an update on the data segment;

obtaining an updated EC stripe that comprises m updated data blocks and k updated parity blocks; and sending an update preparation message to each of the m+k storage nodes in the storage node group, wherein an update preparation message to a storage node comprises a data block or parity block of the updated EC strip that is to be stored in the storage node and a version number of the updated EC strip.

13. The apparatus according to claim 12, wherein the process further comprises:

receiving an update response message from each of the m+k storage nodes except a faulty storage node, wherein an update response message from a non-faulty storage node indicates that the non-faulty storage node has generated a preparation log according to the received update preparation message, and the preparation log comprises the data block or parity block of the updated EC strip that is to be stored in the non-faulty storage node and the version number of the updated EC strip, and wherein the faulty storage node fails to generate a preparation log;

after the faulty storage node is recovered, determining that the version number of the EC stripe stored in the recovered storage node is not the same as the version number of the updated EC stripe in the preparation log generated by each of the non-faulty storage nodes; and sending a deletion message to each of the non-faulty storage nodes, wherein the deletion message instructs each of the non-faulty storage nodes to delete the preparation log generated in response to the update preparation message.

14. The apparatus according to claim 11, wherein the process further comprises:

receiving a recovery message from the faulty storage node after faulty storage node is recovered;

according to EC blocks that are stored in non-faulty storage nodes in the storage node group, determining one or more EC blocks that were stored in the faulty storage node and that were lost; and sequentially sending the one or more lost EC blocks to the recovered storage node for storage.

15. The apparatus according to claim 14, wherein in sequentially sending the one or more lost EC blocks to the recovered storage node for storage, when the apparatus generates a first EC block, and determines that the first EC block is to be stored by the recovered storage node, the apparatus determines whether a second EC block having a same key value as the first EC block exists that are not stored by the recovered storage node, when it is determined that the second EC block exists, after the faulty storage node successfully stores the second EC block, the apparatus sends the first EC block to the recovered storage node for storage.

16. The apparatus according to claim 14, wherein the process of sequentially sending the one or more lost EC blocks to the recovered storage node for storage comprises:

sending a lost EC block to the recovered storage node;

receiving a response message from the recovered storage node corresponding to the lost EC block, wherein the response message indicates that the recovered storage node has successfully stored the lost EC block; and after receiving the response message, sending a next lost EC block to the recovered storage node.

* * * * *